(12) United States Patent
Kasada et al.

(10) Patent No.: US 10,134,433 B2
(45) Date of Patent: Nov. 20, 2018

(54) MAGNETIC TAPE DEVICE, MAGNETIC REPRODUCING METHOD, AND HEAD TRACKING SERVO METHOD

(71) Applicant: FUJIFILM Corporation, Tokyo (JP)

(72) Inventors: Norihito Kasada, Minami-ashigara (JP); Eiki Ozawa, Minami-ashigara (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/920,782

(22) Filed: Mar. 14, 2018

(65) Prior Publication Data
US 2018/0286444 A1 Oct. 4, 2018

(30) Foreign Application Priority Data

Mar. 29, 2017 (JP) ................................. 2017-065730

(51) Int. Cl.
| G11B 15/46 | (2006.01) |
| G11B 5/78 | (2006.01) |
| G11B 5/64 | (2006.01) |
| G11B 5/706 | (2006.01) |
| G11B 5/008 | (2006.01) |
| G11B 5/584 | (2006.01) |

(52) U.S. Cl.
CPC ...... *G11B 5/70626* (2013.01); *G11B 5/00817* (2013.01); *G11B 5/584* (2013.01); *G11B 5/70615* (2013.01)

(58) Field of Classification Search
CPC ..... G11B 5/6005; G11B 5/59633; G11B 5/54; G11B 19/28; G11B 19/06; G11B 2220/20; G11B 15/32; G11B 15/1875; G11B 2220/90; G11B 15/46; G11B 15/43; G11B 15/52; G11B 5/74; G11B 5/70; G11B 5/7305; G11B 5/855; G11B 5/743

USPC ............ 360/55, 69, 75, 77.12, 73.01, 73.04, 360/73.09, 134; 428/826

See application file for complete search history.

(56) References Cited

U.S. PATENT DOCUMENTS 9,105,294 B2 * 8/2015 Jensen ..................... G11B 5/70

FOREIGN PATENT DOCUMENTS

JP 2004-185676 A 7/2004

* cited by examiner

*Primary Examiner* — Nabil Hindi
(74) *Attorney, Agent, or Firm* — Sughrue Mion, PLLC

(57) ABSTRACT

Provided is a magnetic tape device in which a magnetic tape transportation speed is equal to or lower than 18 m/sec, Ra measured regarding a surface of a magnetic layer of a magnetic tape is equal to or smaller than 2.0 nm, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and $\Delta SFD$ $(=SFD_{25°\ C.}-SFD_{-190°\ C.})$ in a longitudinal direction of the magnetic tape is equal to or smaller than 0.50, with the $SFD_{25°\ C.}$ being SFD measured in a longitudinal direction of the magnetic tape at a temperature of 25° C., and the $SFD_{-190°\ C.}$ being SFD measured at a temperature of $-190°$ C.

17 Claims, 2 Drawing Sheets

MAGNETIC TAPE DEVICE, MAGNETIC REPRODUCING METHOD, AND HEAD TRACKING SERVO METHOD

CROSS-REFERENCE TO RELATED APPLICATIONS

This application claims priority under 35 U.S.C 119 to Japanese Patent Application No. 2017-065730 filed on Mar. 29, 2017. The above application is hereby expressly incorporated by reference, in its entirety, into the present application.

BACKGROUND OF THE INVENTION

1. Field of the Invention

The present invention relates to a magnetic tape device, a magnetic reproducing method, and a head tracking servo method.

2. Description of the Related Art

Magnetic recording is used as a method of recording information on a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head in the magnetic disk device. On the other hand, the usage of the TMR head in the magnetic tape device is still currently in a stage where the further use thereof is expected. The reason why the usage thereof is not yet practically realized is because it is not necessary that a reproducing head used in the magnetic tape device have sensitivity improved enough for using the TMR head. Nevertheless, in a case where the TMR head can be used as the reproducing head even in the magnetic tape device, it is possible to deal with higher-density recording of a magnetic tape in the future.

In the magnetic tape device, it is also desired that information recorded on the magnetic tape is reproduced at a high signal-to-noise-ratio (SNR). However, as recording density increases, the SNR tends to decrease.

Therefore, a first object of the invention is to provide a magnetic tape device in which a TMR head is mounted as a reproducing head and information recorded on a magnetic tape is reproduced at a high SNR.

However, in the magnetic tape, information is normally recorded on a data band of the magnetic tape. Accordingly, data tracks are formed in the data band. As means for realizing high capacity of the magnetic tape, a technology of disposing the larger amount of data tracks in a width direction of the magnetic tape by narrowing the width of the data track to increase recording density is used. However, in a case where the width of the data track is narrowed and the recording and/or reproduction of information is performed by transporting the magnetic tape in the magnetic tape device, it is difficult that a magnetic head properly follows the data tracks in accordance with the position change of the magnetic tape, and errors may easily occur at the time of recording and/or reproduction. Thus, as means for preventing occurrence of such errors, a method of forming a servo pattern in the magnetic layer and performing head tracking servo has been recently proposed and practically used. In a magnetic servo type head tracking servo among head tracking servos, a servo pattern is formed in a magnetic layer of a magnetic tape, and this servo pattern is read by a servo head to perform head tracking servo. The head tracking servo is to control a position of a magnetic head in the magnetic tape device. The head tracking servo is more specifically performed as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head of the magnetic tape in the width direction in the magnetic tape device, by performing the head tracking servo. By doing so, it is possible to properly record information in the magnetic tape and/or properly reproduce information recorded on the magnetic tape in the magnetic tape device.

The servo pattern is formed by magnetizing a specific position of the magnetic layer. A plurality of regions including a servo pattern (referred to as "servo bands") are generally present in the magnetic tape capable of performing the head tracking servo along a longitudinal direction. A region interposed between two servo bands is referred to as a data band. The recording of information is performed on the data band and a plurality of data tracks are formed in each data band along the longitudinal direction. In order to realize high capacity of the magnetic tape, it is preferable that the larger number of the data bands which are regions where information is recorded are present in the magnetic layer. As means for that, a technology of increasing a percentage of the data bands occupying the magnetic layer by narrowing the width of the servo band which is not a region in which information is recorded is considered. In regards to this point, the inventors have considered that, since a read track width of the servo pattern becomes narrow, in a case where the width of the servo band becomes narrow, it is desired to use a magnetic head having high sensitivity as the servo head, in order to ensure reading accuracy of the servo pattern. As a magnetic head for this, the inventors focused on a TMR head which has been proposed to be used as a reproducing head in the magnetic disk device in JP2004-185676A. As described above, the usage of the TMR head in the magnetic tape device is still in a stage where the future use thereof as a reproducing head for reproducing information is expected, and the usage of the TMR head as the servo head has not even proposed yet. However, the inventors have thought that, it is possible to deal with realization of higher sensitivity of the future magnetic tape, in a case where the TMR head is used as the servo head in the magnetic tape device which performs the head tracking servo.

In addition, an SNR at the time of reading the servo pattern tends to decrease in accordance with a decrease in read track width of the servo pattern. However, a decrease in SNR at the time of reading the servo pattern causes a decrease in accuracy that the magnetic head follows the data track by the head tracking servo.

Therefore, a second object of the invention is to provide a magnetic tape device in which a TMR head is mounted as a servo head and a servo pattern written on a magnetic tape can be read at a high SNR.

Regarding the first object, as methods of increasing the SNR at the time of reproducing information recorded on the magnetic tape, a method of increasing smoothness of a surface of a magnetic layer of a magnetic tape is used. The inventors have made intensive studies for realizing a higher SNR, by using other methods, in addition to the method of increasing smoothness of a surface of a magnetic layer of a magnetic tape.

Meanwhile, a magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. It is said that a resistance value in the TMR head is generally high, as disclosed in a paragraph 0007 of JP2004-185676A, but generation of a significant decrease in resistance value in the TMR head, while continuing the reproducing of information with the TMR head, may cause a decrease in reproduction output over time with respect to an initial stage of the reproduction.

During intensive studies for achieving the object described above, the inventors have found a phenomenon which was not known in the related art, in that, in a case of using the TMR head as a reproducing head in the magnetic tape device, a significant decrease in resistance value (electric resistance) occurs in the TMR head. A decrease in resistance value in the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of reproducing information by using the TMR head as a reproducing head was not even confirmed in the related art. A difference in the recording and reproducing system between the magnetic disk device and the magnetic tape device, specifically, contact and non-contact between a magnetic recording medium and a magnetic head at the time of the reproducing may be the reason why a significant decrease in resistance value in the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads. It is clear that, a significant decrease in resistance value in the TMR head tends to more significantly occur in a magnetic tape device in which a magnetic tape having high smoothness of a surface of a magnetic layer is mounted as the magnetic tape. In addition, it is also clear that a significant decrease in resistance value in the TMR head particularly significantly occurs, in a case where a transportation speed of a magnetic tape of the magnetic tape device is equal to or lower than a predetermined value (specifically, equal to or lower than 18 m/sec).

With respect to this, as a result of more intensive studies after finding the phenomenon described above, the inventors have newly found that such a significant decrease in resistance value can be prevented by using a magnetic tape described below as the magnetic tape.

One aspect of the invention has been completed based on the finding described above.

That is, according to one aspect of the invention, there is provided a magnetic tape device (hereinafter, also referred to as a magnetic tape device A of a first aspect) comprising: a magnetic tape; and a reproducing head, in which a magnetic tape transportation speed of the magnetic tape device is equal to or lower than 18 m/sec, the reproducing head is a magnetic head (hereinafter, also referred to as a "TMR head") including a tunnel magnetoresistance effect type element (hereinafter, also referred to as a "TMR element") as a reproducing element, the magnetic tape includes a non-magnetic support, and a magnetic layer including ferromagnetic powder and a binding agent on the non-magnetic support, a center line average surface roughness Ra measured regarding a surface of the magnetic layer (hereinafter, also referred to as a "magnetic layer surface roughness Ra") is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees (hereinafter, also simply referred to as a "C-H derived C concentration") is 45 to 65 atom %, and ΔSFD in a longitudinal direction of the magnetic tape calculated by Expression 1 (hereinafter, also simply referred to as "ΔSFD"), $\Delta SFD = SFD_{25°\,C.} - SFD_{-190°\,C.}$ ... Expression 1, is equal to or smaller than 0.50. In Expression 1, the $SFD_{25°\,C.}$ is a switching field distribution SFD measured in a longitudinal direction of the magnetic tape at a temperature of 25° C., and the $SFD_{-190°\,C.}$ is a switching field distribution SFD measured in a longitudinal direction of the magnetic tape at a temperature of −190° C.

According to another aspect of the invention, there is provided a magnetic reproducing method (hereinafter, also referred to as a magnetic reproducing method of a first aspect) comprising: reproducing information recorded on a magnetic tape by a reproducing head, in which a magnetic tape transportation speed during the reproducing is equal to or lower than 18 m/sec, the reproducing head is a magnetic head including a tunnel magnetoresistance effect type element as a reproducing element, the magnetic tape includes a non-magnetic support, and a magnetic layer including ferromagnetic powder and a binding agent on the non-magnetic support, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees (hereinafter, also simply referred to as a "C-H derived C concentration") is 45 to 65 atom %, and ΔSFD in a longitudinal direction of the magnetic tape calculated by Expression 1 is equal to or smaller than 0.50.

According to still another aspect of the invention, there is provided a magnetic tape device (hereinafter, also referred to as a magnetic tape device A of a second aspect) comprising: a magnetic tape; and a reproducing head, in which a magnetic tape transportation speed of the magnetic tape device is equal to or lower than 18 m/sec, the reproducing head is a magnetic head including a tunnel magnetoresistance effect type element as a reproducing element, the magnetic tape includes a non-magnetic support, and a magnetic layer including ferromagnetic powder and a binding agent on the non-magnetic support, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a ratio (Sdc/Sac; hereinafter, also referred to as a "magnetic cluster area ratio Sdc/Sac") of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

According to still another aspect of the invention, there is provided a magnetic reproducing method (hereinafter, also referred to as a magnetic reproducing method of a second aspect) comprising: reproducing information recorded on a magnetic tape by a reproducing head, in which a magnetic tape transportation speed during the reproducing is equal to or lower than 18 m/sec, the reproducing head is a magnetic head including a tunnel magnetoresistance effect type element as a reproducing element, the magnetic tape includes a non-magnetic support, and a magnetic layer including ferromagnetic powder and a binding agent on the non-magnetic support, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a ratio (Sdc/Sac) of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

As described above, as methods of increasing the SNR at the time of reproducing information recorded on the magnetic tape, a method of increasing smoothness of a surface of a magnetic layer of a magnetic tape is used. In regards to the second object, this point is also preferable for increasing the SNR in a case of reading a servo pattern written on the magnetic tape. The inventors have made intensive studies for further increasing the SNR in a case of reading a servo pattern written in the magnetic tape, by using other methods, in addition to the method of increasing smoothness of a surface of a magnetic layer of a magnetic tape.

In a case where the TMR head is used as the servo head, the TMR head detects a change in leakage magnetic field generated from a magnetic layer in which the servo pattern is formed, as a change in resistance value (electric resistance) and reads the servo pattern (reproduces a servo signal) by converting the change in resistance value into a change in voltage. It is said that a resistance value in the TMR head is generally high, as disclosed in a paragraph 0007 of JP2004-185676A, but generation of a significant decrease in resistance value in the TMR head, while continuing the reading of a servo pattern with the TMR head, may cause a decrease in sensitivity of the TMR head, while continuing the head tracking servo. As a result, the accuracy of head position controlling of the head tracking servo may decrease, while continuing the head tracking servo.

During intensive studies for achieving the object described above, the inventors also have found a phenomenon which was not known in the related art, in that, in a case of using the TMR head as a servo head in the magnetic tape device which performs the head tracking servo, a significant decrease in resistance value (electric resistance) occurs in the TMR head. In addition, it is clear that, in a case of using the TMR head as the servo head, a significant decrease in resistance value in the TMR head tends to more significantly occur in a magnetic tape device in which a magnetic tape having high smoothness of a surface of a magnetic layer is mounted as the magnetic tape. Further, it is also clear that, in a case of using the TMR head as the servo head, a significant decrease in resistance value in the TMR head particularly significantly occurs, in a case where a transportation speed of a magnetic tape of the magnetic tape device is equal to or lower than a predetermined value (specifically, equal to or lower than 18 m/sec).

With respect to this, as a result of more intensive studies after finding the phenomenon described above, the inventors have newly found that such a significant decrease in resistance value can be prevented by using a magnetic tape described below as the magnetic tape.

One aspect of the invention has been completed based on the finding described above.

According to still another aspect of the invention, there is provided a magnetic tape device (hereinafter, also referred to as a magnetic tape device B of a first aspect) comprising: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes a servo pattern, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and ΔSFD in a longitudinal direction of the magnetic tape calculated by Expression 1 is equal to or smaller than 0.50.

According to still another aspect of the invention, there is provided a head tracking servo method (hereinafter, also referred to as a head tracking servo method of a first aspect) comprising: reading a servo pattern of a magnetic layer of a magnetic tape by a servo head in a magnetic tape device, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and ΔSFD in a longitudinal direction of the magnetic tape calculated by Expression 1 is equal to or smaller than 0.50.

According to still another aspect of the invention, there is provided a magnetic tape device (hereinafter, also referred to as a magnetic tape device B of a second aspect) comprising: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes a servo pattern, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a ratio (Sdc/Sac) of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

According to still another aspect of the invention, there is provided a head tracking servo method (hereinafter, also referred to as a head tracking servo method of a second aspect) comprising: reading a servo pattern of a magnetic layer of a magnetic tape by a servo head in a magnetic tape device, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a ratio (Sdc/Sac) of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

One aspect of the magnetic tape device, the magnetic reproducing method, and the head tracking servo method is as follows.

In one aspect of the first aspect, the ΔSFD is 0.03 to 0.50.

In one aspect of the first aspect and the second aspect, the center line average surface roughness Ra measured regarding the surface of the magnetic layer is 1.2 nm to 2.0 nm.

In one aspect of the first aspect and the second aspect, the magnetic tape includes a non-magnetic layer including non-magnetic powder and a binding agent between the non-magnetic support and the magnetic layer.

According to one aspect of the invention, it is possible to perform the reproduction at a high SNR, in a case of reproducing information recorded on the magnetic tape with the TMR head at the magnetic tape transportation speed equal to or lower than 18 m/sec, and to prevent occurrence of a significant decrease in resistance value in the TMR head.

According to one aspect of the invention, it is possible to perform the reading at a high SNR, in a case of reading a servo pattern of the magnetic layer of the magnetic tape with the TMR head at the magnetic tape transportation speed equal to or lower than 18 m/sec, and to prevent occurrence of a significant decrease in resistance value in the TMR head.

DESCRIPTION OF THE PREFERRED EMBODIMENTS

Figure 1:
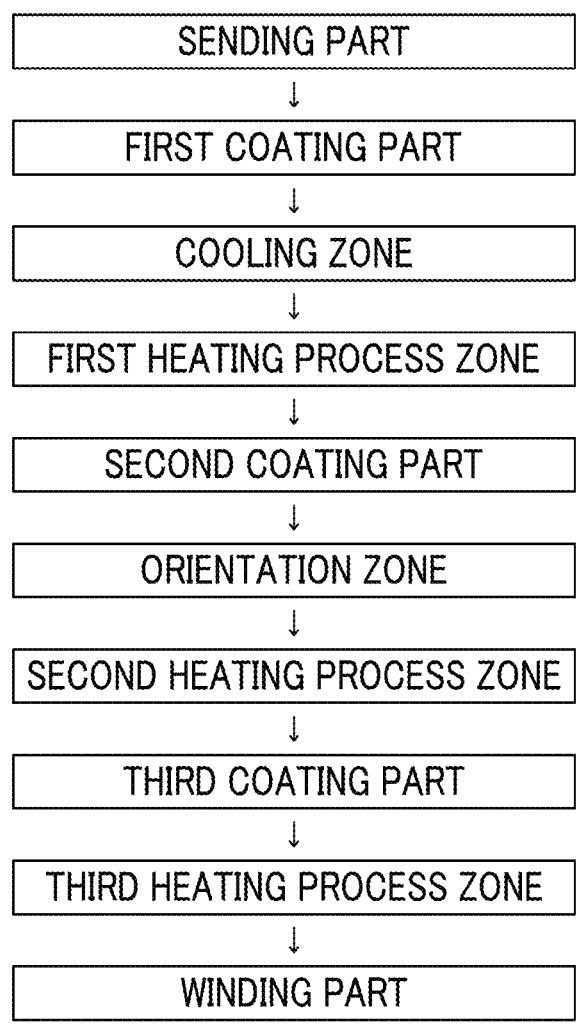
FIG. 1 shows an example (step schematic view) of a specific aspect of a magnetic tape manufacturing step.

A magnetic tape device A of a first aspect and a magnetic tape device A of a second aspect which will be described hereinafter are magnetic tape devices including a TMR head as a reproducing head.

A magnetic reproducing method of the first aspect and a magnetic reproducing method of the second aspect are magnetic reproducing methods using a TMR head as a reproducing head.

A magnetic tape device B of the first aspect and a magnetic tape device B of the second aspect are magnetic tape devices including a TMR head as a servo head.

A head tracking servo method of the first aspect and a head tracking servo method of the second aspect are head tracking servo methods using a TMR head as a servo head.

Hereinafter, the magnetic tape devices A and B of the first aspect, the magnetic reproducing method of the first aspect, and the head tracking servo method of the first aspect are also collectively referred to as a "first aspect".

The magnetic tape devices A and B of the second aspect, the magnetic reproducing method of the second aspect, and the head tracking servo method of the second aspect are also collectively referred to as a "second aspect".

In addition, the magnetic tape device A of the first aspect and the magnetic tape device A of the second aspect are also collectively referred to as a "magnetic tape device A", and the magnetic tape device B of the first aspect and the magnetic tape device B of the second aspect are also collectively referred to as a "magnetic tape device B".

In the first aspect and the second aspect, a magnetic tape includes a non-magnetic support, and a magnetic layer including ferromagnetic powder and a binding agent on the non-magnetic support, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %.

In the first aspect, ΔSFD in a longitudinal direction of the magnetic tape calculated by Expression 1 is equal to or smaller than 0.50.

In the second aspect, a ratio (Sdc/Sac) of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

In the first aspect and the second aspect, a magnetic tape transportation speed is equal to or lower than 18 m/sec.

Hereinafter, an SNR in a case of reproducing information recorded on the magnetic tape and an SNR in a case of reading a servo pattern written on the magnetic tape are also simply collectively referred to as a "SNR".

Hereinafter, a significant decrease in resistance value of the TMR head occurring in a case of reproducing information recorded on the magnetic tape with the TMR head, in the magnetic tape device having the magnetic tape transportation speed equal to or lower than 18 m/sec, and a significant decrease in resistance value of the TMR head occurring in a case of reading a servo pattern written on the magnetic tape with the TMR head, in the magnetic tape device having the magnetic tape transportation speed equal to or lower than 18 m/sec, are also collectively referred to as a "decrease in resistance value of the TMR head".

In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

In the first aspect, the inventors have though that the magnetic layer surface roughness Ra and the ΔSFD set to be in the ranges described above contribute to an increase in SNR in a case of reproducing information recorded on the magnetic tape and in a case of reading a servo pattern written on the magnetic tape. In the second aspect, the inventors have though that the magnetic layer surface roughness Ra and the magnetic cluster area ratio Sdc/Sac set to be in the ranges described above contribute to an increase in SNR in a case of reproducing information recorded on the magnetic tape and in a case of reading a servo pattern written on the magnetic tape.

In the first aspect and the second aspect, the inventors have thought that the C-H derived C concentration set to be in the range described above contributes to the prevention of a significant decrease in resistance value in the TMR head.

Hereinafter, these points will be further described.

The magnetic layer surface roughness Ra equal to or smaller than 2.0 nm can contribute to a decrease in spacing loss causing a decrease in SNR. In addition, in the first aspect, the ΔSFD equal to or smaller than 0.50 can also contribute to improvement of the SNR. It is thought that the ΔSFD is a value which may be an index for a state of ferromagnetic powder present in the magnetic layer. It is surmised that, a state in which the ΔSFD is equal to or smaller than 0.50 is a state in which particles of ferromagnetic powder is suitably aligned and present in the magnetic layer. The inventors have thought that such a state contributes to the reproduction of information recorded on the magnetic tape at a high SNR and the reading of a servo pattern at a high SNR, and as a result, even with information recorded at high density, the reproduction of information and the reading of a servo pattern at a high SNR can be performed. Meanwhile, in the second aspect, the magnetic cluster area ratio Sdc/Sac of 0.80 to 1.30 can also contribute to improvement of the SNR. It is thought that the magnetic cluster area ratio Sdc/Sac is a value which may be an index for a state of ferromagnetic powder present in the magnetic layer. It is surmised that, a state in which the magnetic cluster area ratio Sdc/Sac is 0.80 to 1.30 is a state in which aggregation of particles of ferromagnetic powder is prevented in the magnetic layer, and such a state contributes to the reproduction of information recorded on the magnetic tape at a high SNR and the reading of a servo pattern at a high SNR.

The above descriptions are surmises of the inventors regarding the reproduction of information recorded on the magnetic tape at a high SNR and the reading of a servo pattern at a high SNR, in the first aspect and the second aspect.

In addition, the inventors have considered as follows, regarding the prevention of occurrence of a significant decrease in resistance value and the usage of the TMR head in the magnetic tape.

In the magnetic tape device, in a case of using a magnetic tape of the related art, in a case of using a TMR head as a reproducing head, a phenomenon in which a resistance value (electric resistance) significantly decreases in the TMR head occurs. The same phenomenon also occurs, in a case of using a TMR head as a servo head, in the magnetic tape device.

It is desired that the transportation speed of the magnetic tape of the magnetic tape device is decreased, in order to prevent a deterioration in recording and reproducing characteristics. However, in a case where the transportation speed of the magnetic tape of the magnetic tape device is set to be equal to or lower than a predetermined value (specifically, equal to or lower than 18 m/sec), a decrease in resistance value of the TMR head particularly significantly occurs.

The above phenomenon is a phenomenon that has been newly found by the inventors. The inventors have considered that the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, information recorded on the magnetic tape can be reproduced. By converting the change in resistance value described above into a change in voltage, a servo pattern formed in the magnetic tape can be read (a servo signal can be reproduced).

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reproducing information recorded on the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reproducing information recorded on the magnetic tape and in a case of reading a servo pattern.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurring even at one portion between the two electrodes as described above is a phenomenon which does not occur in other MR heads. In the magnetic disk device using a levitation type recording and reproducing system, a magnetic disk and a reproducing head do not come into contact with each other at the time of reproducing, and thus, damage causing short circuit hardly occurs. On the other hand, in the magnetic tape device using a sliding type recording and reproducing system, in a case where any measures are not prepared, the TMR head is damaged due to the sliding between the TMR head and the magnetic tape, and thus, short circuit easily occurs. Among these, in a case where the transportation speed of the magnetic tape is low, the time for which the same portion of the TMR head comes into contact with the magnetic tape increases at the time of reproducing information by the TMR head and at the time of reading a servo pattern by the TMR head, and accordingly, damage more easily occurs. The inventors have assumed that this is the reason why a decrease in resistance value of the TMR head particularly significantly occurs in a case of using the TMR head in the magnetic tape device having the magnetic tape transportation speed equal to or lower than 18 m/sec. In addition, it is thought that, in a case where the smoothness of the surface of the magnetic layer of the magnetic tape increases, a contact area (so-called real contact area) between the surface of the magnetic layer and the reproducing head increases. It is thought that the reproducing head which is more easily damaged at the time of sliding on the magnetic tape due to an increase in contact area, is a reason why a decrease in resistance value in the TMR head tends to be significant, in the magnetic tape device in which the magnetic tape having high smoothness of the surface of the magnetic layer (specifically, a magnetic tape having the magnetic layer surface roughness Ra equal to or smaller than 2.0 nm) is mounted.

With respect to this, as a result of intensive studies of the inventors, the inventors have newly found that it is possible to prevent a phenomenon in which a decrease in resistance value of the TMR head occurs significantly, in a case of using the TMR head in the magnetic tape device, by using the magnetic tape in which the magnetic layer includes one or more components selected from the group consisting of fatty acid and fatty acid amide, and the C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %. This point will be further described below.

The "X-ray photoelectron spectroscopic analysis" is an analysis method also generally called Electron Spectroscopy for Chemical Analysis (ESCA) or X-ray Photoelectron Spectroscopy (XPS). Hereinafter, the X-ray photoelectron spectroscopic analysis is also referred to as ESCA. The ESCA is an analysis method using a phenomenon of photoelectron emission in a case where a surface of a measurement target sample is irradiated with X ray, and is widely used as an analysis method regarding a surface part of a measurement target sample. According to the ESCA, it is possible to perform qualitative analysis and quantitative analysis by using X-ray photoemission spectra acquired by the analysis regarding the sample surface of the measurement target. A depth from the sample surface to the analysis position (hereinafter, also referred to as a "detection depth") and photoelectron take-off angle generally satisfy the following expression: detection depth≈mean free path of electrons×3×sin θ. In the expression, the detection depth is a depth where 95% of photoelectrons configuring X-ray photoemission spectra are generated, and θ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extreme outermost surface part having a depth of approximately several nm from the sample surface generally becomes an analysis position. Accordingly, in the surface of the magnetic layer of the magnetic tape, according to the analysis performed by the ESCA at a photoelectron take-off angle of 10 degrees, it is possible to perform composition analysis regarding the extreme outermost surface part having a depth of approximately several nm from the surface of the magnetic layer.

The C-H derived C concentration is a percentage of carbon atoms C configuring the C-H bond occupying total (based on atom) 100 atom % of all elements detected by the qualitative analysis performed by the ESCA. The magnetic tape includes one or more components selected from the group consisting of fatty acid and fatty acid amide at least in the magnetic layer. Fatty acid and fatty acid amide are components which can function as lubricants in the magnetic tape. The inventors have considered that, in the surface of the magnetic layer of the magnetic tape including one or more of these components at least in the magnetic layer, the C-H derived C concentration obtained by the analysis performed by the ESCA at a photoelectron take-off angle of 10 degrees becomes an index for the presence amount of the components (one or more components selected from the group consisting of fatty acid and fatty acid amide) in the extreme outermost surface part of the magnetic layer. Specific description is as follows.

In X-ray photoemission spectra (horizontal axis: bonding energy, vertical axis: strength) obtained by the analysis performed by the ESCA, the C1s spectra include information regarding an energy peak of a 1 s orbit of the carbon atoms C. In such C1s spectra, a peak positioned at the vicinity of the bonding energy 284.6 eV is a C-H peak. This C-H peak is a peak derived from the bonding energy of the C-H bond of the organic compound. The inventors have surmised that, in the extreme outermost surface part of the magnetic layer including one or more components selected from the group consisting of fatty acid and fatty acid amide, main constituent components of the C-H peak are components selected from the group consisting of fatty acid and fatty acid amide. Accordingly, the inventors have considered that the C-H derived C concentration can be used as an index for the presence amount as described above.

The inventors have surmised that, a state where the C-H derived C concentration is equal to or greater than 45 atom %, that is, a state where a large amount of one or more components selected from the group consisting of fatty acid and fatty acid amide is present in the extreme outermost surface part of the magnetic layer contributes to smooth sliding between the magnetic tape and the TMR head, thereby preventing occurrence of short circuit due to damage on the TMR head due to the sliding on the magnetic tape having magnetic layer surface roughness Ra of 2.0 nm and excellent smoothness of the surface of the magnetic layer. In a case where the magnetic tape and the TMR head extremely smoothly slide on each other, slipping occurs and damage on the TMR head may occur. With respect to this, the inventors have surmised that, in a case where the C-H derived C concentration is equal to or smaller than 65 atom %, it is possible to prevent occurrence of slipping, and thus, it is possible to prevent occurrence of short circuit due to damage on the TMR head.

However, the above descriptions are merely a surmise of the inventors and the invention is not limited thereto.

Regarding the C-H derived C concentration, JP2016-126817A discloses that the C-H derived C concentration is set to be in a specific range, in order to prevent a decrease in electromagnetic conversion characteristics of a thinned magnetic tape during repeated running under both humidity environments of a low humidity environment and a high humidity environment. However, as described above, the usage of the TMR head as the reproducing head in the magnetic tape device is still currently in a stage where the further use thereof is expected. In addition, the generation of a significant decrease in resistance value of the TMR head in the magnetic tape device in which the TMR head is mounted, and a tendency of a significant decrease in resistance value of the TMR head in the magnetic tape device in which the magnetic tape having the magnetic layer surface roughness Ra of 2.0 nm and excellent smoothness of the surface of the magnetic layer is mounted and the transportation speed of the magnetic tape is equal to or lower than 18 m/sec, are phenomena which were not known in the related art. With respect to such a phenomenon, the effect of the C-H derived C concentration and a possibility of prevention of the phenomenon by setting the C-H derived C concentration to be 45 to 65 atom % is not disclosed in JP2016-126817A and is newly found by the inventors as a result of intensive studies.

However, the above descriptions include a surmise of the inventors. Such a surmise does not limit the invention.

Hereinafter, the first aspect and the second aspect will be described more specifically. The descriptions can be applied to both aspects of the first aspect and the second aspect, unless otherwise noted.

Magnetic Tape

Magnetic Layer Surface Roughness Ra

In the first aspect and the second aspect, the center line average surface roughness Ra measured regarding the surface of the magnetic layer of the magnetic tape (magnetic layer surface roughness Ra) is equal to or smaller than 2.0 nm. This point can contribute to the reproduction of information recorded on the magnetic tape at high density at a high SNR and the reading of the servo pattern written on the magnetic tape a high SNR in the magnetic tape device. From a viewpoint of further increasing the SNR, the magnetic layer surface roughness Ra is preferably equal to or smaller than 1.9 nm, more preferably equal to or smaller than 1.8 nm, even more preferably equal to or smaller than 1.7 nm, still preferably equal to or smaller than 1.6 nm, and still more preferably equal to or smaller than 1.5 nm. In addition, the magnetic layer surface roughness Ra can be, for example, equal to or greater than 1.0 nm or equal to or greater than 1.2 mm. However, from a viewpoint of increasing the SNR, a low magnetic layer surface roughness Ra is preferable, and thus, the magnetic layer surface roughness Ra may be lower than the lower limit exemplified above.

The center line average surface roughness Ra measured regarding the surface of the magnetic layer of the magnetic tape in the invention and the specification is a value measured with an atomic force microscope (AFM) in a region having an area of 40 μm×40 μm of the surface of the magnetic layer. As an example of the measurement conditions, the following measurement conditions can be used. The magnetic layer surface roughness Ra shown in examples which will be described later is a value obtained by the measurement under the following measurement conditions. In the invention and the specification, the "surface of the magnetic layer" of the magnetic tape is identical to the surface of the magnetic tape on the magnetic layer side.

The measurement is performed regarding the region of 40 μm×40 μm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 μm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer or manufacturing conditions of the magnetic tape. Thus, by adjusting one or more of these, it is possible to obtain the magnetic tape having the magnetic layer surface roughness Ra equal to or smaller than 2.0 nm.

C-H Derived C Concentration

In the first aspect and the second aspect, the C-H derived C concentration of the magnetic tape is equal to or greater than 45 atom %, from a viewpoint of preventing a decrease in resistance value of the TMR head. The C-H derived C concentration is preferably equal to or greater than 48 atom % and more preferably equal to or greater than 50 atom %, from a viewpoint of further preventing a decrease in resistance value of the TMR head. The C-H derived C concentration of the magnetic tape is equal to or smaller than 65 atom %, from a viewpoint of preventing a decrease in resistance value of the TMR head. The C-H derived C concentration can also be, for example, equal to or smaller than 63 atom % or equal to or smaller than 60 atom %.

As described above, the C-H derived C concentration is a value obtained by analysis using ESCA. A region for the analysis is a region having an area of 300 μm×700 μm at an arbitrary position of the surface of the magnetic layer of the magnetic tape. The qualitative analysis is performed by wide scan measurement (pass energy: 160 eV, scan range: 0 to 1,200 eV, energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to be measured is included). An atomic concentration (unit: atom %) of each element is calculated from the peak surface area of each spectrum obtained as described above. Here, an atomic concentration (C concentration) of carbon atoms is also calculated from the peak surface area of C1s spectra.

In addition, C1s spectra are obtained (pass energy: 10 eV, scan range: 276 to 296 eV, energy resolution: 0.1 eV/step). The obtained C1s spectra are subjected to a fitting process by a nonlinear least-squares method using a Gauss-Lorentz complex function (Gaussian component: 70%, Lorentz component: 30%), peak resolution of a peak of a C-H bond of the C1s spectra is performed, and a percentage (peak area ratio) of the separated C-H peak occupying the C1s spectra is calculated. A C-H derived C concentration is calculated by multiplying the calculated C-H peak area ratio by the C concentration.

An arithmetical mean of values obtained by performing the above-mentioned process at different positions of the surface of the magnetic layer of the magnetic tape three times is set as the C-H derived C concentration. In addition, the specific aspect of the process described above is shown in examples which will be described later.

As preferred means for adjusting the C-H derived C concentration described above a cooling step can be performed in a non-magnetic layer forming step which will be described later specifically. However, the magnetic tape is not limited to a magnetic tape manufactured through such a cooling step.

Fatty Acid and Fatty Acid Amide

In the first aspect and the second aspect, the magnetic tape includes one or more components selected from the group consisting of fatty acid and fatty acid amide at least in the magnetic layer. The magnetic layer may include only one or both of fatty acid and fatty acid amide. The inventors have considered that the presence of a large amount of the components in the extreme outermost surface part of the magnetic layer so that the C-H derived C concentration becomes 45 to 65 atom % contributes to prevention of a decrease in resistance value of the TMR head. In addition, in the magnetic tape including a non-magnetic layer which will be described later specifically between the non-magnetic support and the magnetic layer, one or more components selected from the group consisting of fatty acid and fatty acid amide may be included in the non-magnetic layer. The non-magnetic layer can play a role of holding a lubricant such as fatty acid or fatty acid amide and supply the lubricant to the magnetic layer. The lubricant such as fatty acid or fatty acid amide included in the non-magnetic layer may be moved to the magnetic layer and present in the magnetic layer.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and specific examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using fatty acid and stearic acid, it is preferable to use stearic acid amide and/or stearic acid ester.

The content of fatty acid of a magnetic layer forming composition is, for example, 0.1 to 10.0 parts by mass and is preferably 1.0 to 7.0 parts by mass, with respect to 100.0 parts by mass of ferromagnetic powder. In a case of adding two or more kinds of different fatty acids to the magnetic layer forming composition, the content thereof is the total content of two or more kinds of different fatty acids. The same applies to other components. In addition, in the invention and the specification, a given component may be used alone or used in combination of two or more kinds thereof, unless otherwise noted.

The content of fatty acid amide in the magnetic layer forming composition is, for example, 0.1 to 3.0 parts by mass and is preferably 0.1 to 1.0 part by mass with respect to 100.0 parts by mass of ferromagnetic powder.

Meanwhile, the content of fatty acid in a non-magnetic layer forming composition is, for example, 1.0 to 10.0 parts by mass and is preferably 1.0 to 7.0 parts by mass with respect to 100.0 parts by mass of non-magnetic powder. In addition, the content of fatty acid amide in the non-magnetic layer forming composition is, for example, 0.1 to 3.0 parts by mass and is preferably 0.1 to 1.0 part by mass with respect to 100.0 parts by mass of non-magnetic powder.

ΔSFD

In the first aspect, the magnetic tape, the ΔSFD in a longitudinal direction of the magnetic tape calculated by Expression 1 is equal to or smaller than 0.50. It is thought that the ΔSFD is a value which may be an index showing a state of ferromagnetic powder present in the magnetic layer. Specifically, it is thought that, as a value of the ΔSFD is small, particles of the ferromagnetic powder are aligned by strong interaction. It is surmised that, a state where the ΔSFD is equal to or smaller than 0.50 is a state where particles of the ferromagnetic powder are suitably aligned and present in the magnetic layer, and such a state contributes to an increase in SNR at the time of reproducing information recorded on the magnetic tape by the TMR head, and as a result, even information recorded at high density can be reproduced at a high SNR. It is surmised that the state described above contributes to an increase in SNR in a case of reading a servo pattern written on the magnetic tape by the TMR head.

From a viewpoint of further increasing the SNR, the ΔSFD is preferably equal to or smaller than 0.48, more preferably equal to or smaller than 0.45, even more preferably equal to or smaller than 0.40, still more preferably equal to or smaller than 0.35, and still even more preferably equal to or smaller than 0.30. In addition, from a viewpoint of further more increasing the SNR, the ΔSFD is preferably equal to or greater than 0.03, more preferably equal to or greater than 0.05, and even more preferably equal to or greater than 0.10.

The SFD in a longitudinal direction of the magnetic tape can be measured by using a well-known magnetic properties measurement device such as an oscillation sample type magnetic-flux meter. The same applies to the measurement of the SFD of the ferromagnetic powder. In addition, a measurement temperature of the SFD can be adjusted by setting the measurement device.

According to the studies of the inventors, the ΔSFD calculated by Expression 1 can be controlled by a preparation method of the magnetic tape, and mainly the following tendencies were seen: (A) the value decreases, as dispersibility of ferromagnetic powder in the magnetic layer increases; (B) the value decreases, as ferromagnetic powder having small temperature dependency of SFD is used as the ferromagnetic powder; and (C) the value decreases, as the particles of the ferromagnetic powder are aligned in a longitudinal direction of the magnetic layer (as a degree of orientation in a longitudinal direction increases), and the value increases, as a degree of orientation in a longitudinal direction decreases.

For example, regarding (A), dispersion conditions are reinforced (an increase in dispersion time, a decrease in diameter and/or an increase in degree of filling of dispersion beads used in the dispersion, and the like), and a dispersing agent is used. As a dispersing agent, a well-known dispersing agent or a commercially available dispersing agent can be used.

Meanwhile, regarding (B), as an example, ferromagnetic powder in which a difference $\Delta SFD_{powder}$ between SFD of the ferromagnetic powder measured at a temperature of 100° C. and SFD thereof measured at a temperature of 25° C., which are calculated by Expression 2 is 0.05 to 1.50, can be used, for example. However, even in a case where the difference $\Delta SFD_{powder}$ is not in the range described above, it is possible to control the ΔSFD of the magnetic tape calculated by Expression 1 to be equal to or smaller than 0.50 by other controlling methods.

$$\Delta SFD_{powder} = SFD_{powder 100° C.} - SFD_{powder 25° C.} \quad \text{Expression 2}$$

(In Expression 2, the $SFD_{powder 100° C.}$ is a switching field distribution SFD of ferromagnetic powder measured at a temperature of 100° C., and the $SFD_{powder 25° C.}$ is a switching field distribution SFD of ferromagnetic powder measured at a temperature of 25° C.)

Regarding (C), the ΔSFD tends to decrease by performing the orientation process of the magnetic layer as longitudinal orientation. The ΔSFD tends to increase by performing the orientation process of the magnetic layer as homeotropic alignment or setting non-orientation without performing the orientation process.

Accordingly, for example, it is possible to obtain a magnetic tape in which the ΔSFD calculated by Expression 1 is equal to or smaller than 0.50, by respectively controlling one of the methods (A) to (C) or a combination of two or more arbitrary methods.

Magnetic Cluster Area Ratio Sdc/Sac

In the second aspect, the magnetic cluster area ratio Sdc/Sac of the magnetic tape is 0.80 to 1.30. It is thought that the magnetic cluster area ratio Sdc/Sac is a value which may be an index showing a state of ferromagnetic powder present in the magnetic layer. Specifically, in the magnetic layer of the magnetic tape in the AC demagnetization state, each ferromagnetic particle faces a random direction and the total amount of magnetization is close to zero. Accordingly, each ferromagnetic particle can be substantially present in a state of a primary particle. Thus, a size of the magnetic cluster in the AC demagnetization state (specifically, average area Sac which will be described later in detail) can be a value which does not vary depending on an aggregation state of ferromagnetic particles of the magnetic layer. Meanwhile, a size of the magnetic cluster in the DC demagnetization (a degree of a magnetic field was set as zero, after applying DC magnetic field) state (specifically, average area Sdc which will be described later in detail) corresponds to a size of an aggregate of the ferromagnetic particles and varies depending on a degree of aggregation of the ferromagnetic particles in the magnetic layer. As the ferromagnetic particles are aggregated, the value thereof tends to increase. Therefore, it is thought that a small difference between the Sdc and Sac means that the aggregation of the particles of the ferromagnetic powder is prevented. For details of this point, a description disclosed in paragraphs 0014 to 0017 of JP2007-294084A can be referred to, for example.

It is thought that the magnetic cluster area ratio Sdc/Sac which is 0.80 to 1.30 contributes to an increase in SNR at the time of reproducing information recorded on the magnetic tape by the TMR head and at the time of reading a servo pattern written on the magnetic tape by the TMR head. From a viewpoint of further increasing the SNR, the magnetic cluster area ratio Sdc/Sac is preferably equal to or smaller than 1.28, more preferably equal to or smaller than 1.25, even more preferably equal to or smaller than 1.20, still preferably equal to or smaller than 1.15, still more preferably equal to or smaller than 1.10, still even more preferably equal to or smaller than 1.05, and still further more preferably equal to or smaller than 1.00. A lower limit of the measurement value of the magnetic cluster area ratio Sdc/Sac is 0.80 as known in the related art (for example, see a paragraph 0018 of JP2007-294084A).

The magnetic cluster area ratio Sdc/Sac of the invention and the specification is a value obtained by the following method by measurement performed using a magnetic force microscope (MFM).

Two samples cut out from the same magnetic tape are prepared. One sample is used for measuring the Sac by performing the AC demagnetization and the other sample is used for measuring the Sdc by allowing the DC demagnetization.

The Sac is a value obtained by the following method.

With a magnetic force microscope, a magnetic force image is obtained in a square area having a length of a side of 5 μm (5 μm×5 μm) of a surface of a magnetic layer of the sample regarding which demagnetization is performed in the alternating magnetic field (alternating current (AC) demagnetization). An area of the magnetic force image is calculated after performing noise removing and hole filling treatment regarding the obtained magnetic force image, by using well-known image analysis software. The above operation is performed with respect to magnetic force images of arbitrarily selected 10 different points of the surface of the magnetic layer, and an arithmetical mean (average area) of the areas of the magnetic force image is calculated. The average area calculated as described above is set as the Sac.

The Sdc is a value obtained by the following method.

The sample was subjected to direct current (DC) demagnetization at applying magnetic field of 796 kA/m (10 kOe), and then, a magnetic force image having a square area having a length of a side of 5 μm (5 μm×5 μm) of the sample subjected to the DC demagnetization is obtained by using a magnetic force microscope. An area of the magnetic force image is calculated after performing noise removing and hole filling treatment regarding the obtained magnetic force image, by using well-known image analysis software. The above operation is performed with respect to magnetic force images of arbitrarily selected 10 different points of the surface of the magnetic layer, and an arithmetical mean (average area) of the areas of the magnetic force image is calculated. The average area calculated as described above is set as the Sdc.

The ratio (Sdc/Sac) of the Sdc and Sac obtained as described above is set as the magnetic cluster area ratio Sdc/Sac.

The obtaining of the magnetic force image with a magnetic force microscope is performed by using a commercially available magnetic force microscope or a magnetic force microscope having a well-known configuration in a frequency modulation (FM) mode. As a probe of the magnetic force microscope, SSS-MFMR (nominal radius of curvature of 15 nm) manufactured by NanoWorld AG can be used, for example. A distance between the surface of the magnetic layer and a distal end of the probe at the time of the magnetic force microscope observation is 20 to 50 nm. In addition, well-known analysis software or analysis software using a well-known arithmetic expression can be used as the image analysis software.

The magnetic cluster area ratio Sdc/Sac can be controlled to be 0.80 to 1.30 by preventing the aggregation of the ferromagnetic particles of the magnetic layer. As a method for preventing the aggregation, the following method can be used, for example.

As a binding agent included in the magnetic layer, a binding agent having high affinity with a solvent used in preparation of a magnetic layer forming composition is used.

Dispersion conditions at the time of preparing the magnetic layer forming composition are adjusted.

A process for crushing aggregation of ferromagnetic particles is performed after arbitrarily applying the magnetic layer forming composition onto the non-magnetic support through a non-magnetic layer.

For the above point and other controlling methods, descriptions disclosed in paragraphs 0012 and 0032 and examples of JP4001532B, and paragraphs 0024 to 0026, 0028, 0029, 0105 and 0106, and examples of JP2007-294084A can be referred to, for example.

In addition, regarding ferromagnetic powder having low saturation magnetization σs, ferromagnetic particles configuring the ferromagnetic powder are hardly aggregated, and even in a case where the ferromagnetic particles are aggregated, the aggregation tends to be easily crushed. Accordingly, a method of forming a magnetic layer by using ferromagnetic powder having low saturation magnetization as can be a method of controlling the magnetic cluster area ratio Sdc/Sac.

For example, the magnetic cluster area ratio Sdc/Sac can be controlled to be 0.80 to 1.30 by arbitrarily combining one or two or more various methods described above.

In one aspect, the Sdc and Sac are respectively preferably 3,000 to 50,000 $nm^2$, more preferably 3,000 to 35,000 $nm^2$, and even more preferably 3,000 to 20,000 $nm^2$. The Sdc and Sac are respectively preferably equal to or greater than 3,000 $nm^2$, from a viewpoint of stability of magnetization, and are respectively preferably equal to or smaller than 50,000 $nm^2$, from a viewpoint of increasing resolution at the time of high-density recording. The Sac can be controlled by using the average particle size of the ferromagnetic powder used for forming the magnetic layer, and the Sdc can be controlled by preventing aggregation of the ferromagnetic particles of the magnetic layer. The method of preventing the aggregation is as described above.

Next, the magnetic layer and the like included in the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

In one aspect, it is preferable to use ferromagnetic powder in which the difference $\Delta SFD_{powder}$ between the SFD measured at a temperature of 100° C. and the SFD measured at a temperature of 25° C., which are calculated by Expression 2 is in the range described above.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long, axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more components selected from the group consisting of fatty acid and fatty acid amide, and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. In addition, as described above, it is preferable to use a binding agent having high affinity with a solvent, from a viewpoint of preventing aggregation of the ferromagnetic particles of the magnetic layer.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC).

As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a lubricant, a dispersing agent, a dispersing assistant, an antibacterial agent, an antistatic agent, and an antioxidant. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic filler is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic filler such as an abrasive, in order to decrease the magnetic layer surface roughness Ra.

Fatty Acid Ester

One or both of the magnetic layer and the non-magnetic layer which will be described later specifically may include or may not include fatty acid ester.

All of fatty acid ester, fatty acid, and fatty acid amide are components which can function as a lubricant. The lubricant is generally broadly divided into a fluid lubricant and a boundary lubricant. Fatty acid ester is called a component which can function as a fluid lubricant, whereas fatty acid and fatty acid amide is called as a component which can function as a boundary lubricant. It is considered that the boundary lubricant is a lubricant which can be adsorbed to a surface of powder (for example, ferromagnetic powder) and form a rigid lubricant film to decrease contact friction. Meanwhile, it is considered that the fluid lubricant is a lubricant which can form a liquid film on a surface of a magnetic layer to decrease flowing of the liquid film. As described above, it is considered that the operation of fatty acid ester is different from the operation fatty acid and fatty acid amide as the lubricants. As a result of intensive studies of the inventors, by setting the C-H derived C concentration which is considered as an index for the presence amount of one or more components selected from the group consisting of fatty acid and fatty acid amide in the extreme outermost surface part of the magnetic layer to be 45 to 65 atom %, it is possible to prevent a significant decrease in resistance value of the TMR head, in the magnetic tape device which includes the magnetic tape having the magnetic layer surface roughness Ra equal to or smaller than 2.0 nm and in which the magnetic tape transportation speed is equal to or lower than 18 m/sec.

As fatty acid ester, esters of various fatty acids described above regarding fatty acid can be used. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester of the magnetic layer forming composition is, for example, 0 to 10.0 parts by mass and is preferably 1.0 to 7.0 parts by mass with respect to 100.0 parts by mass of ferromagnetic powder.

In addition, the content of fatty acid ester in the non-magnetic layer forming composition is, for example, 0 to 10.0 parts by mass and is preferably 1.0 to 7.0 parts by mass with respect to 100.0 parts by mass of non-magnetic powder.

Non-Magnetic Layer

Next, the non-magnetic layer will be described. In the first aspect and the second aspect, the magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

In the first aspect and the second aspect, the magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.00 to 6.00 μm.

A thickness of the magnetic layer is preferably equal to or smaller than 0.15 μm and more preferably equal to or smaller than 0.10 μm, from a viewpoint of realization of high-density recording required in recent years. The thickness of the magnetic layer is even more preferably 0.01 to 0.10 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.10 to 1.50 μm and is preferably 0.10 to 1.00 μm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.80 µm, more preferably equal to or smaller than 1.50 µm, and even more preferably equal to or smaller than 1.10 µm, from a viewpoint of thinning the magnetic tape. In addition, the total thickness of the magnetic layer and the non-magnetic layer can be, for example, equal to or greater than 0.10 µm.

A thickness of the back coating layer is preferably equal to or smaller than 0.90 µm and even more preferably 0.10 to 0.70 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In a manufacturing step of the magnetic tape, a well-known manufacturing technology of the related art can be used in a part of the step or in the entire step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are preferable. These dispersion beads are preferably used by optimizing a bead diameter and a filling percentage. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 µm can be used, for example. In addition, as described above, as one method of obtaining a magnetic tape in which the ΔSFD calculated by Expression 1 is equal to or smaller than 0.50, it is preferable that the dispersion conditions are reinforced (an increase in dispersion time, a decrease in diameter and/or an increase in degree of filling of dispersion beads used in the dispersion, and the like). Further, as described above, it is also preferable that the dispersion conditions for controlling the magnetic cluster area ratio Sdc/Sac are adjusted. An increase in dispersion time, a decrease in diameter of dispersion beads used in the dispersion, an increase in filling percentage of the dispersion beads, and the like are preferable, from a viewpoint of preventing aggregation of the ferromagnetic particles of the magnetic layer.

Coating Step, Cooling Step, and Heating and Drying Step

The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

As described above, in one aspect, the magnetic tape includes the non-magnetic layer between the non-magnetic support and the magnetic layer. Such a magnetic tape can be preferably manufactured by successive multilayer coating. A manufacturing step of performing the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

In the non-magnetic layer forming step of the manufacturing step of performing such successive multilayer coating, it is preferable to perform a coating step by using the non-magnetic layer forming composition including one or more components selected from the group consisting of fatty acid and fatty acid amide and to perform a cooling step of cooling the coating layer between the coating step and the heating and drying step, in order to adjust the C-H derived C concentration to be 45 to 65 atom % in the magnetic tape including at least one or more components selected from the group consisting of fatty acid and fatty acid amide in the magnetic layer. The reason thereof is not clear, but the inventors has surmised that the reason thereof is because the components (fatty acid and/or fatty acid amide) are moved to the surface of the non-magnetic layer at the time of solvent volatilization of the heating and drying step, by cooling the coating layer of the non-magnetic layer forming composition before the heating and drying step. However, this is merely the surmise, and the invention is not limited thereto.

In the magnetic layer forming step, a coating step of applying a magnetic layer forming composition including ferromagnetic powder, a binding agent, and a solvent onto a non-magnetic layer to form a coating layer, and a heating and drying step of drying the formed coating layer by a heating process can be performed. The magnetic tape includes one or more components selected from the group consisting of fatty acid and fatty acid amide in the magnetic layer. In a case where the magnetic tape includes the non-magnetic layer between the non-magnetic support and the magnetic layer, the magnetic layer forming composition preferably includes one or more components selected from the group consisting of fatty acid and fatty acid amide, in order to manufacture such a magnetic tape. However, it is not necessary that the magnetic layer forming composition includes one or more components selected from the group consisting of fatty acid and fatty acid amide. This is because that a magnetic layer including one or more components selected from the group consisting of fatty acid and fatty acid amide can be formed, by applying the magnetic layer forming composition onto a non-magnetic layer to form the magnetic layer, after the components included in the non-magnetic layer forming composition are moved to the surface of the non-magnetic layer.

Hereinafter, a specific aspect of the manufacturing method of the magnetic tape will be described with reference to FIG. 1. However, the invention is not limited to the following specific aspect.

FIG. 1 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 1, an operation of sending a non-magnetic support (elongated film) from a sending part and winding the non-magnetic support around a winding part is continuously performed, and various processes of coating, drying, and orientation are performed in each part or each zone shown in FIG. 1, and thus, it is possible to sequentially form a non-magnetic layer and a magnetic layer on one surface of the running non-magnetic support by multilayer coating and to form a back coating layer on the other surface thereof. The manufacturing step which is normally performed for manufacturing the coating type magnetic recording medium can be performed in the same manner except for including a cooling zone.

The non-magnetic layer forming composition is applied onto the non-magnetic support sent from the sending part in a first coating part (coating step of non-magnetic layer forming composition).

After the coating step, a coating layer of the non-magnetic layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably $-10°$ C. to $0°$ C. and more preferably $-5°$ C. to $0°$ C. The time for performing the cooling step (for example, time while an arbitrary part of the coating layer is delivered to and sent from the cooling zone (hereinafter, also referred to as a "staying time")) is not particularly limited, and in a case where the time described above is long, the C-H derived C concentration tends to be increased. Thus, the time described above is preferably adjusted by performing preliminary experiment if necessary, so that the C-H derived C concentration of 45 to 65 atom % is realized. In the cooling step, cooled air may blow to the surface of the coating layer.

After the cooling zone, in a first heating process zone, the coating layer is heated after the cooling step to dry the coating layer (heating and drying step). The heating and drying process can be performed by causing the non-magnetic support including the coating layer after the cooling step to pass through the heated atmosphere. An atmosphere temperature of the heated atmosphere here is, for example, approximately $60°$ to $140°$. Here, the atmosphere temperature may be a temperature at which the solvent is volatilized and the coating layer is dried, and the atmosphere temperature is not limited to the atmosphere temperature in the range described above. In addition, the heated air may arbitrarily blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After that, in the aspect of performing the orientation process, while the coating layer of the magnetic layer forming composition is wet, an orientation process of the ferromagnetic powder in the coating layer is performed in an orientation zone. For the orientation process, various well-known technologies such as descriptions disclosed in a paragraph 0067 of JP2010-231843A and a paragraph 0052 of JP2010-24113A can be used. In addition, in one aspect, a process for preventing the aggregation of the ferromagnetic particles included in the coating layer can be performed before and/or after the orientation process. As an example of such a process, a smoothing process can be used. The smoothing process is a process of applying shear to the coating layer by a smoother.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By the step described above, it is possible to obtain the magnetic tape including the non-magnetic layer and the magnetic layer in this order on one surface of the non-magnetic support and including the back coating layer on the other surface thereof.

In order to manufacture the magnetic tape, well-known various processes for manufacturing the coating type magnetic recording medium can be performed. For example, for various processes, descriptions disclosed in paragraphs 0067 to 0069 of JP2010-231843A can be referred to.

By doing so, it is possible to obtain a magnetic tape which can be used in the first aspect and the second aspect. However, the manufacturing method described above is merely an example, the magnetic layer surface roughness Ra, the C-H derived C concentration, the ΔSFD, and the magnetic cluster area ratio Sdc/Sac can be controlled to be in respective ranges described above by an arbitrary method capable of adjusting the magnetic layer surface roughness Ra, the C-H derived C concentration, the ΔSFD, and the magnetic cluster area ratio Sdc/Sac, and such an aspect is also included in the invention.

Formation of Servo Pattern

In the first aspect and the second aspect, in the aspect in which the TMR head is used as the servo head, the magnetic tape includes a servo pattern in the magnetic layer. In the first aspect and the second aspect, in the aspect in which the TMR head is used as the reproducing head, the magnetic tape arbitrarily includes a servo pattern in the magnetic layer. The writing of a servo pattern on the magnetic tape, specifically, formation of a servo pattern on the magnetic layer is performed by magnetizing a specific position of the magnetic layer with a servo pattern recording head (also referred to as a "servo write head"). A well-known technology regarding a servo pattern of the magnetic layer of the magnetic tape which is well known can be applied for the shapes of the servo pattern with which the head tracking servo can be performed and the disposition thereof in the magnetic layer. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

The magnetic tape described above is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce information (magnetic signals) to the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of the magnetic signal is performed. In addition, a servo head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the servo head comes into contact with and slides on the surface of the magnetic layer of the magnetic tape, and accordingly, the reading of the servo pattern is performed by the servo head. With respect to this, in the twin reel type magnetic tape cartridge, both reels of the supply reel and the winding reel are provided in the magnetic tape cartridge. In the first aspect and the second aspect, the magnetic tape may be accommodated in any of single reel type magnetic tape cartridge and twin reel type magnetic tape cartridge. The configuration of the magnetic tape cartridge is well known.

Reproducing Head and Servo Head

In the first aspect and the second aspect, the device A includes a TMR head as the reproducing head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a reproducing element for reproducing information recorded on the magnetic tape (specifically, information recorded on the magnetic layer of the magnetic tape). By converting the detected change in resistance value into a change in voltage, the information recorded on the magnetic tape can be reproduced.

In the first aspect and the second aspect, the device B includes a TMR head as the servo head. The TMR element can play a role of detecting a change in leakage magnetic field from the magnetic tape as a change in resistance value (electric resistance) by using a tunnel magnetoresistance effect, as a servo pattern reading element for reading a servo pattern formed in the magnetic layer of the magnetic tape. By converting the detected change in resistance value into a change in voltage, the servo pattern can be read (servo signal can be reproduced).

In the first aspect and the second aspect, as the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the information recorded on the magnetic tape can be reproduced. In addition, by converting the change in resistance value into a change in voltage, the servo pattern can be read. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in resistance value (electric resistance) tends to become significant, in a case where the magnetic tape transportation speed is equal to or lower than 18 m/sec and the magnetic layer surface roughness Ra of the magnetic tape is equal to or smaller than 2.0 nm. However, a significant decrease in resistance value occurring in a case of reproducing information recorded on the magnetic tape causes a decrease in reproduction output over time with respect to an initial stage of the reproduction. In addition, the generation of a significant decrease in resistance value in the TMR head, while continuing the reading of a servo pattern with the TMR head, may cause a decrease in sensitivity of the TMR head, while continuing the head tracking servo. With respect to this, such a significant decrease in resistance value of the TMR head can be prevented by setting the C-H derived C concentration of the magnetic device to be in the range described above.

In one preferred aspect, in the magnetic tape device, information recorded on the magnetic tape at linear recording density equal to or greater than 250 kfci can be reproduced by using the TMR head as the reproducing head. The unit, kfci, is a unit of linear recording density (not able to convert to the SI unit system). As the linear recording density increases, a magnetic signal (leakage magnetic field) obtained from the magnetic layer of the magnetic tape on which the information is recorded tends to become weak, and thus, in a case where any measures are not prepared, the SNR tends to decrease. As one reason thereof, it is thought that noise caused by the magnetic tape (so-called medium noise) significant affects the SNR, in a high linear recording density region. However, this decrease in SNR can be prevented by setting the magnetic layer surface roughness Ra and the ΔSFD of the magnetic tape to be in respective ranges described above, in the first aspect, and by setting the magnetic layer surface roughness Ra and the magnetic cluster area ratio Sdc/Sac of the magnetic tape to be in respective ranges described above, in the second aspect. In the device A of the first aspect and the second aspect, it is possible to perform high-sensitivity reproducing of information recorded at high linear recording density, by using the TMR head as the reproducing head. The linear recording density can be, for example, equal to or greater than 250 kfci and can also be equal to or greater than 300 kfci. The linear recording density can be, for example, equal to or smaller than 800 kfci and can also exceed 800 kfci.

In the first aspect and the second aspect, the TMR head used as the reproducing head is a magnetic head including at least the TMR element as a reproducing element for reproducing information recorded on the magnetic tape. Such a magnetic head may include or may not include an element for recording information in the magnetic tape. That is, the reproducing head and the recording head may be one magnetic head or separated magnetic heads. In addition, the magnetic head including the TMR element as a reproducing element may include a servo pattern reading element for performing head tracking servo.

In the first aspect and the second aspect, the TMR head used as the servo head is a magnetic head including at least the TMR element as a servo pattern reading element. The servo head may include or may not include a reproducing element for reproducing information recorded on the magnetic tape. That is, the servo head and the reproducing head may be one magnetic head or separated magnetic heads. The same applies to a recording element for performing the recording of information in the magnetic tape.

Magnetic Tape Transportation Speed

In the first aspect and the second aspect, the magnetic tape transportation speed is equal to or lower than 18 m/sec. In the invention and the specification, in the aspect in which the TMR head is used as the reproducing head, the magnetic tape transportation speed is a relative speed between the magnetic tape and the reproducing head in a case where the magnetic tape is transported (runs) in the magnetic tape device in order to reproduce information recorded on the magnetic tape. In the aspect in which the TMR head is used as the servo head, the magnetic tape transportation speed is a relative speed between the magnetic tape transported in the magnetic tape device and the servo head in a case where the servo pattern is read by the servo head. Normally, the magnetic tape transportation speed described above is set in a control unit of the magnetic tape device. It is desired that the magnetic tape is transported at a low speed in the magnetic tape device, in order to prevent a deterioration of recording and reproducing characteristics. But, in a case where the magnetic tape transportation speed is equal to or lower than 18 m/sec in the magnetic tape device including the TMR head as a reproducing head and the magnetic tape device including the TMR head as a servo head, a decrease in resistance value of the TMR head occurs particularly significantly. Such a decrease in resistance value can be prevented by using a magnetic tape having the C-H derived C concentration of 45 to 65 atom %. The magnetic tape transportation speed is equal to or lower than 18 m/sec or may be equal to or lower than 15 m/sec or equal to or lower than 10 m/sec. The magnetic tape transportation speed can be, for example, equal to or higher than 1 m/sec.

Head Tracking Servo

In the first aspect and the second aspect, in the aspect in which the TMR head is used as the servo head, the head tracking servo is performed. In addition, in the first aspect and the second aspect, in the aspect in which the TMR head is used as the reproducing head, the head tracking servo can also be performed.

Hereinafter, as one specific aspect of the head tracking servo, head tracking servo in the timing-based servo system will be described. However, the head tracking servo of the invention is not limited to the following specific aspect.

In the head tracking servo in the timing-based servo system (hereinafter, referred to as a "timing-based servo"), a plurality of servo patterns having two or more different shapes are formed in a magnetic layer, and a position of a servo head is recognized by an interval of time in a case where the servo head has read the two servo patterns having different shapes and an interval of time in a case where the servo head has read two servo patterns having the same shapes. The position of the magnetic head of the magnetic tape in the width direction is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 2:
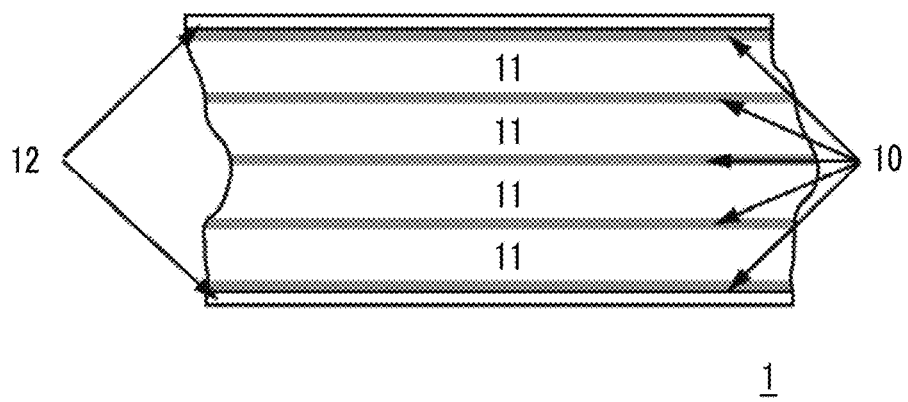
FIG. 2 shows an example of disposition of data bands and servo bands.
Figure 3:
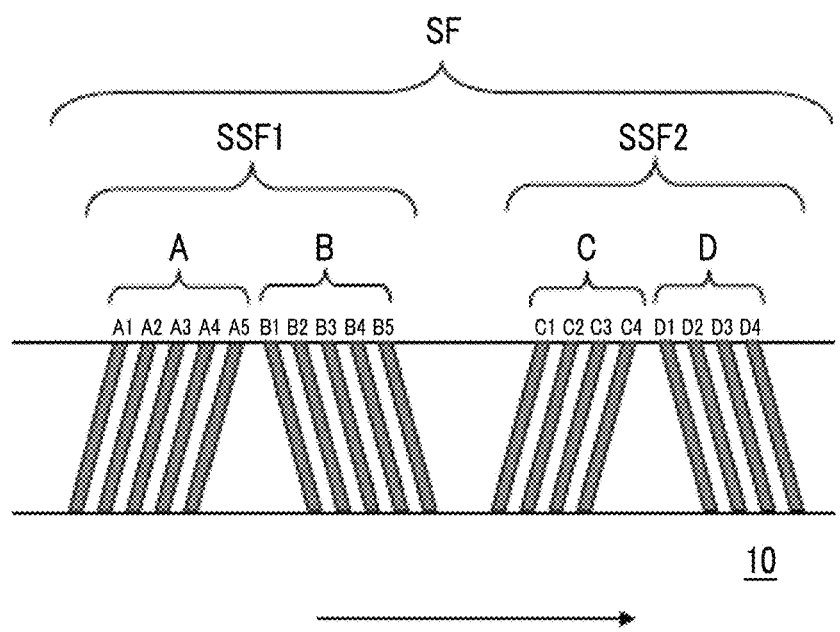
FIG. 3 shows a servo pattern disposition example of a linear-tape-open (LTO) Ultrium format tape.

FIG. 2 shows an example of disposition of data bands and servo bands. In FIG. 2, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 3 are formed on a servo band in a case of manufacturing a magnetic tape. Specifically, in FIG. 3, a servo frame SF on the servo band 10 is configured with a servo sub-frame 1 (SSF1) and a servo sub-frame 2 (SSF2). The servo sub-frame 1 is configured with an A burst (in FIG. 3, reference numeral A) and a B burst (in FIG. 3, reference numeral B). The A burst is configured with servo patterns A1 to A5 and the B burst is configured with servo patterns B1 to B5. Meanwhile, the servo sub-frame 2 is configured with a C burst (in FIG. 3, reference numeral C) and a D burst (in FIG. 3, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 3 shows one servo frame for explaining. However, in practice, in the magnetic layer of the magnetic tape in which the head tracking servo in the timing-based servo system is performed, a plurality of servo frames are disposed in each servo band in a running direction. In FIG. 3, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 3, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 2 and 3, but also to entire timing-based servo systems.

For the details of the head tracking servo in the timing-based servo system, well-known technologies such as technologies disclosed in U.S. Pat. No. 5,689,384A, U.S. Pat. No. 6,542,325B, and U.S. Pat. No. 7,876,521B can be referred to, for example. In addition, for the details of the head tracking servo in the amplitude-based servo system, well-known technologies disclosed in U.S. Pat. No. 5,426,543A and U.S. Pat. No. 5,898,533A can be referred to, for example.

According to one aspect of the invention, the following magnetic tapes are also provided. Details of the following magnetic tapes are the same as those described in the first aspect.

A magnetic tape used in a magnetic tape device in which a TMR head is used as a reproducing head and a magnetic tape transportation speed in a case of reproducing information recorded on the magnetic tape is equal to or lower than 18 m/sec, the magnetic tape including: a magnetic layer including ferromagnetic powder and a binding agent on a non-magnetic support, in which a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and ΔSFD in a longitudinal direction of the magnetic tape calculated by Expression 1 is equal to or smaller than 0.50.

A magnetic tape used in a magnetic tape device in which a TMR head is used as a servo head and a magnetic tape transportation speed in a case of reading a servo pattern of a magnetic layer of the magnetic tape is equal to or lower than 18 m/sec, the magnetic tape including: a magnetic layer including ferromagnetic powder and a binding agent on a non-magnetic support, in which a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and ΔSFD in a longitudinal direction of the magnetic tape calculated by Expression 1 is equal to or smaller than 0.50.

In addition, according to one aspect of the invention, the following magnetic tapes are also provided. Details of the following magnetic tapes are the same as those described in the second aspect.

A magnetic tape used in a magnetic tape device in which a TMR head is used as a reproducing head and a magnetic tape transportation speed in a case of reproducing information recorded on the magnetic tape is equal to or lower than 18 m/sec, the magnetic tape including: a magnetic layer including ferromagnetic powder and a binding agent on a non-magnetic support, in which a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a magnetic cluster area ratio Sdc/Sac is 0.80 to 1.30.

A magnetic tape used in a magnetic tape device in which a TMR head is used as a servo head and a magnetic tape transportation speed in a case of reading a servo pattern of a magnetic layer of the magnetic tape is equal to or lower than 18 m/sec, the magnetic tape including: a magnetic layer including ferromagnetic powder and a binding agent on a non-magnetic support, in which a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a magnetic cluster area ratio Sdc/Sac is 0.80 to 1.30.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

Examples and Comparative Examples According to First Aspect

Example 1-1

1. Manufacturing of Magnetic Tape
(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 30 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic powder (Ferromagnetic hexagonal ferrite powder (barium ferrite)): 100.0 parts
  Average particle size, coercivity He, and $\Delta SFD_{powder}$ calculated by Expression 2: see Table 5
$SO_3Na$ group-containing polyurethane resin: 14.0 parts
  Weight-average molecular weight: 70,000, $SO_3Na$ group: 0.2 meq/g
Cyclohexanone: 150.0 parts
Methyl ethyl ketone: 150.0 parts
Abrasive Liquid
Alumina dispersion prepared in the section (1): 6.0 parts
Silica Sol (projection forming agent liquid)
Colloidal silica: 2.0 parts
Average particle size: see Table 5
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) manufactured by Nippon Polyurethane Industry Co., Ltd.): 2.5 parts
Finishing Additive Solvent
Cyclohexanone: 200.0 parts
Methyl ethyl ketone: 200.0 parts (3) Non-Magnetic Layer Forming Composition List
Non-magnetic inorganic powder: α-iron oxide: 100.0 parts
  Average particle size (average long axis length): 0.15 μm
  Average acicular ratio: 7
  BET specific surface area: 52 $m^2/g$
Carbon black: 20.0 parts
  Average particle size: 20 nm
$SO_3Na$ group-containing polyurethane resin: 18.0 parts
  (Weight-average molecular weight: 70,000, $SO_3Na$ group: 0.2 meq/g)
Stearic acid: 2.0 parts
Stearic acid amide: 0.2 parts
Butyl stearate: 2.0 parts
Cyclohexanone: 300.0 parts
Methyl ethyl ketone: 300.0 parts (4) Back Coating Layer Forming Composition List
Non-magnetic inorganic powder: α-iron oxide: 80.0 parts
  Average particle size (average long axis length): 0.15 μm
  Average acicular ratio: 7
  BET specific surface area: 52 $m^2/g$
Carbon black: 20.0 parts
  Average particle size: 20 nm
A vinyl chloride copolymer: 13.0 parts
Sulfonic acid group-containing polyurethane resin: 6.0 parts
Phenylphosphonic acid: 3.0 parts
Stearic acid: 3.0 parts
Butyl stearate: 3.0 parts
Polyisocyanate (CORONATE (registered trademark) L manufactured by Nippon Polyurethane Industry Co., Ltd.): 5.0 parts
Methyl ethyl ketone: 155.0 parts
Cyclohexanone: 355.0 parts (5) Preparation of Each Layer Forming Composition
(i) Preparation of Magnetic Layer Forming Composition The magnetic layer forming composition was prepared by the following method.

A magnetic solution was prepared by performing beads-dispersing of the magnetic solution components described above by using beads as the dispersion medium in a batch type vertical sand mill. The dispersion time of the beads dispersion was set as the dispersion time shown in Table 5 and zirconia beads having a bead diameter of 0.5 mm were used as the dispersion beads. The prepared magnetic solution and the abrasive liquid were mixed with other components (silica sol, other components, and finishing additive solvent) and beads-dispersed for 5 minutes by using the sand mill, and ultrasonic dispersion was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared. A part of the prepared magnetic layer forming composition was collected and a dispersion particle diameter which is an index for dispersibility of ferromagnetic powder (ferromagnetic hexagonal barium ferrite powder) was measured by a method which will be described later. The measured value is shown in Table 5.

(ii) Preparation of Non-Magnetic Layer Forming Composition

The non-magnetic layer forming composition was prepared by the following method.

Each component excluding stearic acid, stearic acid amide, butyl stearate, cyclohexanone, and methyl ethyl ketone was beads-dispersed by using batch type vertical sand mill for 24 hours to obtain a dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having a hole diameter of 0.5 μm and a non-magnetic layer forming composition was prepared.

(iii) Preparation of Back Coating Layer Forming Composition

The back coating layer forming composition was prepared by the following method.

Each component excluding stearic acid, butyl stearate, polyisocyanate, and cyclohexanone was kneaded and diluted by an open kneader. Then, the obtained mixed solution was subjected to a dispersion process of 12 passes, with a transverse beads mill dispersing device and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1.0 μm and a back coating layer forming composition was prepared.

(6) Manufacturing Method of Magnetic Tape

A magnetic tape was manufactured by the specific aspect shown in FIG. 1. The magnetic tape was specifically manufactured as follows.

A support made of polyethylene naphthalate having a thickness of 5.00 μm was sent from the sending part, and the non-magnetic layer forming composition prepared in the section (5) was applied to one surface thereof so that the thickness after the drying becomes 1.00 μm in the first coating part, to form a coating layer. The cooling step was performed by passing the formed coating layer through the cooling zone in which the atmosphere temperature is adjusted to 0° C. for the staying time shown in Table 5 while the coating layer is wet, and then the heating and drying step was performed by passing the coating layer through the first heating process zone at the atmosphere temperature of 100° C., to form a non-magnetic layer.

Then, the magnetic layer forming composition prepared in the section (5) was applied onto the non-magnetic layer so that the thickness after the drying becomes 70 nm (0.07 μm) in the second coating part, and a coating layer was formed. This coating layer was dried in the second heating process zone (atmosphere temperature of 100° C.) without performing the orientation process (non-orientation).

After that, in the third coating part, the back coating layer forming composition prepared in the section (5) was applied to the surface of the non-magnetic support made of polyethylene naphthalate on a side opposite to the surface where the non-magnetic layer and the magnetic layer are formed, so that the thickness after the drying becomes 0.40 μm, to form a coating layer, and the formed coating layer was dried in a third heating process zone (atmosphere temperature of 100° C.).

After that, a calender process (surface smoothing treatment) was performed with a calender roll configured of only a metal roll, at a speed of 80 m/min, linear pressure of 294 kN/m (300 kg/cm), and a calender temperature (surface temperature of a calender roll) shown in Table 5.

Then, a heating process was performed in the environment of the atmosphere temperature of 70° C. for 36 hours. After the heating process, the layer was slit to have a width of ½ inches (0.0127 meters). In a state where the magnetic layer of the manufactured magnetic tape was demagnetized, servo patterns having disposition and shapes according to the LTO Ultrium format were formed on the magnetic layer by using a servo write head mounted on a servo tester. Accordingly, a magnetic tape including data bands, servo bands, and guide bands in the disposition according to the LTO Ultrium format in the magnetic layer, and including servo patterns having the disposition and the shape according to the LTO Ultrium format on the servo band is manufactured. The servo tester includes a servo write head and a servo head. This servo tester was also used in evaluations which will be described later.

The thickness of each layer and the thickness of the non-magnetic support of the magnetic tape manufactured as described above were acquired by the following method. It was confirmed that the thickness of each layer and the thickness of the non-magnetic support were the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation of physical properties described below, and the other part was used in order to measure an SNR and a resistance value of the TMR head which will be described later.

2. Evaluation of Ferromagnetic Powder and Magnetic Layer Forming Composition (1) Dispersion Particle Diameter of Magnetic Layer Forming Composition A part of the magnetic layer forming composition prepared as described above was collected, and a sample solution diluted by an organic solvent used in the preparation of the composition to 1/50 based on mass was prepared.

Regarding the prepared sample solution, an arithmetic average particle diameter measured by using an optical scattering type particle size analyzer (LB500 manufactured by Horiba, Ltd.) was used as the dispersion particle diameter.

(2) Average Particle Size of Ferromagnetic Powder

An average particle size of the ferromagnetic powder was obtained by the method described above.

(3) $\Delta SFD_{powder}$ and Coercivity Hc of Ferromagnetic Powder

Regarding the ferromagnetic powder, the SFDs were measured at a temperature of 100° C. and a temperature of 25° C. with an applied magnetic field of 796 kA/m (10 kOe) by using an oscillation sample type magnetic-flux meter (manufactured by Toei Industry Co., Ltd.). From measurement results of the SFDs, the $\Delta SFD_{powder}$ was calculated by Expression 2.

The coercivity Hc of the ferromagnetic powder was measured at a temperature of 25° C. with an applied magnetic field of 796 kA/m (10 kOe) by using an oscillation sample type magnetic-flux meter (manufactured by Toei Industry Co., Ltd.).

The evaluation was performed in examples and comparative examples which will be described later in the same manner as described above.

3. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 μm/sec, and a resolution was set as 512 pixel×512 pixel.

(2) $\Delta SFD$

The SFDs were measured in a longitudinal direction of the magnetic tape at a temperature of 25° C. and a temperature of −190° C. with an applied magnetic field of 796 kA/m (10 kOe) by using an oscillation sample type magnetic-flux meter (manufactured by Toei Industry Co., Ltd.). From measurement results, the $\Delta SFD$ in a longitudinal direction of the magnetic tape was calculated by Expression 1.

(3) C-H Derived C Concentration

The X-ray photoelectron spectroscopic analysis was performed regarding the surface of the magnetic layer of the magnetic tape (measurement region: 300 μm×700 μm) by the following method using an ESCA device, and a C-H derived C concentration was calculated from the analysis result.

Analysis and Calculation Method

All of the measurement (i) to (iii) described below were performed under the measurement conditions shown in Table 1.

TABLE 1

| Device | AXIS-ULTRA manufactured by Shimadzu Corporation |
|---|---|
| Excitation X-ray source | Monochromatic Al-Kα ray (output: 15 kV, 20 mA) |
| Analyzer mode | Spectrum |
| Lens mode | Hybrid (analysis area: 300 μm × 700 μm) |
| Neutralization electron gun for charge correction (Charge neutraliser) | ON (used) |
| Light electron extraction angle (take-off angle) | 10 deg. (angle formed by a detector and a sample surface) |

(i) Wide Scan Measurement

A wide scan measurement (measurement conditions: see Table 2) was performed regarding the surface of the magnetic layer of the magnetic tape with the ESCA device, and the types of the detected elements were researched (qualitative analysis).

TABLE 2

| Scan range | Pass energy | Energy resolution (Step) | Capturing time (Dwell) | Number of integration times (Sweeps) |
|---|---|---|---|---|
| 0 to 1200 eV | 160 eV | 1 eV/step | 100 ms/step | 5 |

(ii) Narrow Scan Measurement

All elements detected in (i) described above were subjected to narrow scan measurement (measurement conditions: see Table 3). An atom concentration (unit: atom %) of each element detected was calculated from a peak surface area of each element by using software for a data process attached to the device (Vision 2.2.6). Here, the C concentration was also calculated.

TABLE 3

| Spectra[Note1] | Scan range | Pass energy | Energy resolution (Step) | Capturing time (Dwell) | Number of integration times (Sweeps)[Note2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

Note 1) Spectra shown in Table 3 (element type) are examples, and in a case where an element not shown in Table 3 is detected by the qualitative analysis of the section (1), the same narrow scan measurement is performed in a scan range including entirety of spectra of the elements detected.

Note 2) The spectra having excellent signal-to-noise ratio (S/N ratio) were measured in a case where the number of integration times is set as three times. However, even in a case where the number of integration times regarding the entirety of spectra is set as five times, the quantitative results are not affected.

(iii) Acquiring of C1s Spectra

The C1s spectra were acquired under the measurement conditions disclosed in Table 4. Regarding the acquired C1s spectra, after correcting a shift (physical shift) due to a sample charge by using software for a data process attached to the device (Vision 2.2.6), a fitting process (peak resolution) of the C1s spectra was performed by using the software described above. In the peak resolution, the fitting of C1s spectra was performed by a nonlinear least-squares method using a Gauss-Lorentz complex function (Gaussian component: 70%, Lorentz component: 30%), and a percentage (peak area ratio) of the C-H peak occupying the C1s spectra was calculated. A C-H derived C concentration was calculated by multiplying the calculated C-H peak area ratio by the C concentration acquired in (ii) described above.

TABLE 4

| Spectra | Scan range | Pass energy | Energy resolution (Step) | Capturing time (Dwell) | Number of integration times (Sweeps) |
| --- | --- | --- | --- | --- | --- |
| C1s | 276 to 296 eV | 10 eV | 0.1 eV/step | 200 ms/step | 20 |

An arithmetical mean or values obtained by performing the above-mentioned process at different positions of the surface of the magnetic layer of the magnetic tape three times is set as the C-H derived C concentration.

4. Measurement of SNR in Case of Reproducing Information Recorded on Magnetic Tape with Reproducing Head In an environment of an atmosphere temperature of 23° C.±1° C. and relative humidity of 50%, the magnetic tape manufactured in the part 1. was attached to a reel tester having a width of ½ inches (0.0127 meters) fixed to a recording head and a reproducing head, and information was recorded and reproduced. As the recording head, a metal-in-gap (MIG) head (gap length of 0.15 µm, track width of 1.0 µm) was used, and the reproducing head, a TMR head (element width of 70 nm) commercially available as a reproducing head for HDD was used. The recording was performed at linear recording density of 300 kfci, the reproduction output at the time of reproducing was measured, and the SNR was obtained as a ratio of the reproduction output and noise. The magnetic tape transportation speed (relative speed of the magnetic tape and the magnetic head) in a case of performing the reproduction was set as a value shown in Table 5. The SNR was calculated as a relative value by setting the SNR measured as 0 dB in Comparative Example 1-1 which will be described later. In a case where the SNR calculated as described above is equal to or greater than 7.0 dB, it is possible to evaluate that performance of dealing with future needs accompanied with high-density recording is obtained.

5. Measurement of Resistance Value of Reproducing Head

In an environment of an atmosphere temperature of 23° C.±1° C. and relative humidity of 50%, the magnetic tape manufactured in the part 1. was attached to a reel tester having a width of ½ inches (0.0127 meters) fixed to a recording head and a reproducing head, and information was recorded and reproduced. As the recording head, a MIG head (gap length of 0.15 µm, track width of 1.0 µm) was used, and the TMR head (element width of 70 nm) commercially available as a reproducing head for HDD was used as the reproducing head. A tape length of the magnetic tape was 1,000 m, and a total of 4,000 passes of the transportation (running) of the magnetic tape was performed by setting the relative speed of the magnetic tape and the magnetic head (magnetic tape transportation speed) at the time of performing reproducing as a value shown in Table 5. The reproducing head was moved in a width direction of the magnetic tape by 2.5 µm for 1 pass, a resistance value (electric resistance) of the reproducing head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a reproducing head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 5.

6. Measurement of SNR in Case of Reading Servo Pattern of Magnetic Tape with Servo Head The servo head of the servo tester was replaced with a commercially available TMR head (element width of 70 nm) as a reproducing head for HDD. The reading of a servo pattern was performed by attaching the magnetic tape manufactured in the section 1. to the servo tester and by setting the magnetic tape transportation speed (relative speed of the magnetic tape and the servo head) as a value shown in Table 5, and the SNR was obtained as a ratio of the output and noise. The SNR was calculated as a relative value by setting the SNR measured as 0 dB in Comparative Example 1-1 which will be described later. In a case where the SNR calculated as described above is equal to or greater than 7.0 dB, it is possible to evaluate that performance of dealing with future needs accompanied with high-density recording is obtained.

7. Measurement of Resistance Value of Servo Head

The servo head of the servo tester was replaced with a commercially available TMR head (element width of 70 nm) as a reproducing head for HDD. In the servo tester, the magnetic tape manufactured in the part 1. was transported while bringing the surface of the magnetic layer into contact with the servo head and causing sliding therebetween. A tape length of the magnetic tape was 1,000 m, and a total of 4,000 passes of the transportation (running) of the magnetic tape was performed by setting the magnetic tape transportation speed (relative speed of the magnetic tape and the servo head) at the time of the transportation as a value shown in Table 5. The servo head was moved in a width direction of the magnetic tape by 2.5 μm for 1 pass, a resistance value (electric resistance) of the servo head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a servo head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 5.

Examples 1-2 to 1-10 and Comparative Examples 1-1 to 1-12

1. Manufacturing of Magnetic Tape

A magnetic tape was manufactured in the same manner as in Example 1-1, except that various conditions shown in Table 5 were changed as shown in Table 5.

In Table 5, in the comparative examples in which "none" is shown in a column of the orientation, the magnetic layer was formed without performing the orientation process in the same manner as in Example 1-1.

In the examples in which "longitudinal" is disclosed in a column of the orientation, the cooling step was performed by passing the coating layer through the cooling zone in which the atmosphere temperature is adjusted to 0° C. for the staying time shown in Table 5 while the coating layer of the magnetic layer forming composition is wet, and then, a longitudinal orientation process was performed by applying a magnetic field having a magnetic field strength of 0.3 T to the surface of the coating layer in a longitudinal direction. After that, the coating layer was dried in the second heating process zone (atmosphere temperature of 100° C.).

In Table 5, in the comparative examples in which "not performed" is disclosed in a column of the cooling zone staying time, a magnetic tape was obtained by a manufacturing step not including the cooling zone.

2. Evaluation of Physical Properties of Magnetic Tape

Various physical properties of the manufactured magnetic tape were evaluated in the same manner as in Example 1-1.

3. Measurement of SNR in Case of Reproducing Information Recorded on Magnetic Tape with Reproducing Head The SNR was measured by the same method as that in Example 1-1, by using the manufactured magnetic tape. The magnetic tape transportation speed in a case of performing the reproduction was set as a value shown in Table 5. In Examples 1-2 to 1-10 and Comparative Examples 1-5 to 1-12, the TMR head which was the same as that in Example 1-1 was used as a reproducing head. In Comparative Examples 1-1 to 1-4, a commercially available spin valve type GMR head (element width of 70 nm) was used as a reproducing head.

4. Measurement of Resistance Value of Reproducing Head

A resistance value of the reproducing head was measured by the same method as that in Example 1-1, by using the manufactured magnetic tape. The magnetic tape transportation speed in a case of performing the reproduction was set as a value shown in Table 5. As the reproducing head, the same reproducing head (TMR head or GMR head) as the reproducing head used in the measurement of the SNR was used. In Comparative Examples 1-1 to 1-4, the GMR head used as the reproducing head was a magnetic head having a CIP structure including two electrodes with an MR element interposed therebetween in a direction orthogonal to the transportation direction of the magnetic tape. A resistance value was measured in the same manner as in Example 1-1, by bringing an electric resistance measuring device into contact with a wiring connecting these two electrodes.

5. Measurement of SNR in Case of Reading Servo Pattern of Magnetic Tape with Servo Head The SNR was measured by the same method as that in Example 1-1, by using the manufactured magnetic tape. The magnetic tape transportation speed in a case of reading a servo pattern was set as a value shown in Table 5. In Examples 1-2 to 1-10 and Comparative Examples 1-5 to 1-12, the TMR head which was the same as that in Example 1-1 was used as a servo head. In Comparative Examples 1-1 to 1-4, a commercially available spin valve type GMR head (element width of 70 nm) was used as a servo head.

6. Measurement of Resistance Value of Servo Head

A resistance value of the servo head was measured by the same method as that in Example 1-1, by using the manufactured magnetic tape.

The magnetic tape transportation speed in a case of reading a servo pattern was set as a value shown in Table 5. As the servo head, the same servo head (TMR head or GMR head) as the servo head used in the measurement of the SNR was used. In Comparative Examples 1-1 to 1-4, the GMR head used as the servo head was a magnetic head having a CIP structure including two electrodes with an MR element interposed therebetween in a direction orthogonal to the transportation direction of the magnetic tape. A resistance value was measured in the same manner as in Example 1-1, by bringing an electric resistance measuring device into contact with a wiring connecting these two electrodes.

The results of the evaluations described above are shown in Table 5.

TABLE 5-1

| | Ferromagnetic hexagonal ferrite powder | | | Dispersion | | | Colloidal silica average particle size | Calender temperature | Cooling zone staying time |
|---|---|---|---|---|---|---|---|---|---|
| | $\Delta SFD_{powder}$ | Hc (Oe) | Hc (kA/m) | Average particle size (nm) | Beads dispersion time (hour) | Dispersion particle diameter (nm) | Orientation | | | |

| | $\Delta SFD_{powder}$ | Hc (Oe) | (kA/m) | Average particle size (nm) | Beads dispersion time (hour) | Dispersion particle diameter (nm) | Orientation | Colloidal silica average particle size | Calender temperature | Cooling zone staying time |
|---|---|---|---|---|---|---|---|---|---|---|
| Comparative Example 1-1 | 0.30 | 1978 | 157 | 25 | 48 | 20 | None | 120 nm | 80° C. | Not performed |
| Comparative Example 1-2 | 0.30 | 1978 | 157 | 25 | 48 | 20 | None | 120 nm | 90° C. | Not performed |
| Comparative Example 1-3 | 0.30 | 1978 | 157 | 25 | 48 | 20 | None | 80 nm | 90° C. | Not performed |
| Comparative Example 1-4 | 0.30 | 1978 | 157 | 25 | 48 | 20 | None | 40 nm | 110° C. | Not performed |
| Comparative Example 1-5 | 0.30 | 1978 | 157 | 25 | 48 | 20 | None | 120 nm | 90° C. | Not performed |
| Comparative Example 1-6 | 0.30 | 1978 | 157 | 25 | 48 | 20 | None | 120 nm | 90° C. | Not performed |
| Comparative Example 1-7 | 0.30 | 1978 | 157 | 25 | 48 | 20 | None | 80 cm | 90° C. | Not performed |
| Comparative Example 1-8 | 0.30 | 1978 | 157 | 25 | 48 | 20 | None | 40 cm | 110° C. | Not performed |
| Comparative Example 1-9 | 0.20 | 2011 | 160 | 25 | 48 | 20 | None | 80 nm | 90° C. | Not performed |
| Comparative Example 1-10 | 0.20 | 2011 | 160 | 25 | 48 | 20 | None | 80 nm | 90° C. | 180 seconds |
| Comparative Example 1-11 | 0.30 | 1978 | 157 | 25 | 48 | 20 | None | 80 nm | 90° C. | 1 second |
| Comparative Example 1-12 | 0.30 | 1978 | 157 | 25 | 48 | 20 | None | 80 nm | 90° C. | Not performed |
| Example 1-1 | 0.20 | 2011 | 160 | 25 | 48 | 20 | Longitudinal | 80 nm | 90° C. | 1 second |
| Example 1-2 | 0.80 | 1850 | 147 | 23.5 | 48 | 20 | Longitudinal | 80 nm | 90° C. | 1 second |
| Example 1-3 | 0.30 | 1978 | 157 | 25 | 48 | 20 | Longitudinal | 80 nm | 90° C. | 1 second |
| Example 1-4 | 0.10 | 1840 | 146 | 23 | 35 | 50 | Longitudinal | 80 nm | 90° C. | 1 second |
| Example 1-5 | 0.10 | 1840 | 146 | 23 | 48 | 20 | Longitudinal | 80 nm | 90° C. | 1 second |
| Example 1-6 | 0.30 | 1978 | 157 | 25 | 48 | 20 | Longitudinal | 80 nm | 90° C. | 5 seconds |
| Example 1-7 | 0.30 | 1978 | 157 | 25 | 48 | 20 | Longitudinal | 80 nm | 90° C. | 50 seconds |
| Example 1-8 | 0.30 | 1978 | 157 | 25 | 48 | 20 | Longitudinal | 40 nm | 110° C. | 50 seconds |
| Example 1-9 | 0.30 | 1978 | 157 | 25 | 48 | 20 | Longitudinal | 40 nm | 110° C. | 50 seconds |
| Example 1-10 | 0.30 | 1978 | 157 | 25 | 48 | 20 | Longitudinal | 40 nm | 110° C. | 50 seconds |

TABLE 5-2

Evaluation Results of Physical Properties of Magnetic Tape

| | Center line average surface roughness Ra measured regarding surface of magnetic layer | C-H derived C concentration | $\Delta SFD$ |
|---|---|---|---|
| Comparative Example 1-1 | 2.8 nm | 35 atom% | 0.63 |
| Comparative Example 1-2 | 2.5 nm | 35 atom% | 0.63 |
| Comparative Example 1-3 | 2.0 nm | 35 atom% | 0.63 |
| Comparative Example 1-4 | 1.5 nm | 35 atom% | 0.63 |
| Comparative Example 1-5 | 2.8 nm | 35 atom% | 0.63 |
| Comparative Example 1-6 | 2.5 nm | 35 atom% | 0.63 |
| Comparative Example 1-7 | 2.0 nm | 35 atom% | 0.63 |
| Comparative Example 1-8 | 1.5 nm | 35 atom% | 0.63 |
| Comparative Example 1-9 | 2.0 nm | 35 atom% | 0.48 |
| Comparative Example 1-10 | 2.0 nm | 70 atom% | 0.48 |
| Comparative Example 1-11 | 2.0 nm | 45 atom% | 0.63 |
| Comparative Example 1-12 | 2.0 nm | 35 atom% | 0.63 |
| Example 1-1 | 2.0 nm | 45 atom% | 0.48 |
| Example 1-2 | 2.0 nm | 45 atom% | 0.33 |
| Example 1-3 | 2.0 nm | 45 atom% | 0.21 |
| Example 1-4 | 2.0 nm | 45 atom% | 0.16 |
| Example 1-5 | 2.0 nm | 45 atom% | 0.05 |
| Example 1-6 | 2.0 nm | 55 atom% | 0.21 |
| Example 1-7 | 2.0 nm | 65 atom% | 0.21 |
| Example 1-8 | 1.5 nm | 65 atom% | 0.21 |
| Example 1-9 | 1.5 nm | 65 atom% | 0.21 |
| Example 1-10 | 1.5 nm | 65 atom% | 0.21 |

TABLE 5-3

Evaluation Results Regarding Reproducing Head

| | Reproducing head | Transportation speed | SNR (dB) | Number of times of occurrence of decrease in resistance value (times) | Rate of decrease in resistance value (%) |
|---|---|---|---|---|---|
| Comparative Example 1-1 | GMR | 18 m/sec | 0 | 0 | 0 |
| Comparative Example 1-2 | GMR | 18 m/sec | 2.2 | 0 | 0 |
| Comparative Example 1-3 | GMR | 18 m/sec | 4.5 | 0 | 0 |
| Comparative Example 1-4 | GMR | 18 m/sec | 6.8 | 0 | 0 |
| Comparative Example 1-5 | TMR | 18 m/sec | 0.7 | 1 | — |
| Comparative Example 1-6 | TMR | 18 misec | 3.2 | 3 | — |
| Comparative Example 1-7 | TMR | 18 m/sec | 5.5 | 7 | — |
| Comparative Example 1-8 | TMR | 18 m/sec | 7.7 | 9 | — |
| Comparative Example 1-9 | TMR | 18 m/sec | 7.0 | 7 | — |
| Comparative Example 1-10 | TMR | 18 m/sec | 7.0 | 1 | — |
| Comparative Example 1-11 | TMR | 18 m/sec | 5.5 | 0 | 5 |
| Comparative Example 1-12 | TMR | 19 m/sec | 5.5 | 0 | 20 |
| Example 1-1 | TMR | 18 m/sec | 7.0 | 0 | 5 |
| Example 1-2 | TMR | 18 m/sec | 7.2 | 0 | 5 |
| Example 1-3 | TMR | 18 m/sec | 7.5 | 0 | 5 |
| Example 1-4 | TMR | 18 in/sec | 7.3 | 0 | 5 |
| Example 1-5 | TMR | 18 m/sec | 7.2 | 0 | 5 |
| Example 1-6 | TMR | 18 m/sec | 7.5 | 0 | 4 |
| Example 1-7 | TMR | 18 m/sec | 7.5 | 0 | 2 |
| Example 1-8 | TMR | 18 m/sec | 9.3 | 0 | 11 |
| Example 1-9 | TMR | 10 m/sec | 9.3 | 0 | 13 |
| Example 1-10 | TMR | 1 m/sec | 9.3 | 0 | 21 |

TABLE 5-4

Evaluation Results Regarding Servo Head

| | Servo head | Transportation speed | SNR (dB) | Number of times of occurrence of decrease in resistance value (times) | Rate of decrease in resistance value (%) |
|---|---|---|---|---|---|
| Comparative Example 1-1 | GMR | 18 m/sec | 0 | 0 | 0 |
| Comparative Example 1-2 | GMR | 18 m/sec | 2.2 | 0 | 0 |
| Comparative Example 1-3 | GMR | 18 m/sec | 4.5 | 0 | 0 |
| Comparative Example 1-4 | GMR | 18 m/sec | 6.8 | 0 | 0 |
| Comparative Example 1-5 | TMR | 18 m/sec | 0.7 | 1 | — |
| Comparative Example 1-6 | TMR | 18 m/sec | 3.2 | 3 | — |
| Comparative Example 1-7 | TMR | 18 m/sec | 5.5 | 7 | — |
| Comparative Example 1-8 | TMR | 18 m/sec | 7.7 | 9 | — |
| Comparative Example 1-9 | TMR | 18 m/sec | 7.0 | 7 | — |
| Comparative Example 1-10 | TMR | 18 m/sec | 7.0 | 1 | — |
| Comparative Example 1-11 | TMR | 18 m/sec | 5.5 | 0 | 5 |
| Comparative Example 1-12 | TMR | 19 m/sec | 5.5 | 0 | 20 |
| Example 1-1 | TMR | 18 m/sec | 7.0 | 0 | 5 |
| Example 1-2 | TMR | 18 m/sec | 7.2 | 0 | 5 |
| Example 1-3 | TMR | 18 m/sec | 7.5 | 0 | 5 |
| Example 1-4 | TMR | 18 m/sec | 7.3 | 0 | 5 |
| Example 1-5 | TMR | 18 m/sec | 7.2 | 0 | 5 |
| Example 1-6 | TMR | 18 m/sec | 7.5 | 0 | 4 |
| Example 1-7 | TMR | 18 m/sec | 7.5 | 0 | 2 |
| Example 1-8 | TMR | 18 m/sec | 9.3 | 0 | 11 |
| Example 1-9 | TMR | 10 m/sec | 9.3 | 0 | 13 |
| Example 1-10 | TMR | 1 m/sec | 9.3 | 0 | 21 |

As shown in Table 5, in Examples 1-1 to 1-10, the information recorded on the magnetic tape at high linear recording density could be reproduced at a high SNR by using the TMR head as the reproducing head. In addition, in Examples 1-1 to 1-10, the servo pattern could be read at a high SNR by using the TMR head as the servo head. Further, in Examples 1-1 to 1-10, a significant decrease in resistance value of the TMR head, in a case of reproducing information recorded on the magnetic tape having the magnetic layer surface roughness Ra equal to or smaller than 2.0 nm and in a case of reading a servo pattern, can be prevented by setting the magnetic tape transportation speed to be equal to or lower than 18 m/sec.

Examples and Comparative Examples According to Second Aspect

Example 2-1

1. Preparation of Magnetic Tape
(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a SO$_3$Na group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 m$^2$/g, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic powder (Ferromagnetic hexagonal ferrite powder (barium ferrite)): 100.0 parts
Average particle size and saturation magnetization σs: see Table 6
Polyurethane resin A: see Table 6
Cyclohexanone: 150.0 parts
Methyl ethyl ketone: 150.0 parts
Abrasive Liquid
Alumina dispersion prepared in the section (1): 6.0 parts
Silica Sol
Colloidal silica: 2.0 parts
Average particle size: see Table 6
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) L manufactured by Nippon Polyurethane Industry Co., Ltd.): 2.5 parts
Finishing Additive Solvent
Cyclohexanone: 200.0 parts
Methyl ethyl ketone: 200.0 parts
(3) Non-Magnetic Layer Forming Composition List
Non-magnetic inorganic powder: α-iron oxide: 100.0 parts
Average particle size (average long axis length): 0.15 μm
Average acicular ratio: 7
BET specific surface area: 52 m$^2$/g
Carbon black: 20.0 parts
Average particle size: 20 nm
A vinyl chloride copolymer: 13.0 parts
SO$_3$Na group-containing polyurethane resin: 9.0 parts
Weight-average molecular weight: 70,000, SO$_3$Na group: 0.2 meq/g
Phenylphosphonic acid: 3.0 parts
Stearic acid: 2.0 parts
Stearic acid amide: 0.2 parts
Butyl stearate: 2.0 parts
Cyclohexanone: 300.0 parts
Methyl ethyl ketone: 300.0 parts
(4) Back Coating Layer Forming Composition List
Non-magnetic inorganic powder: α-iron oxide: 80.0 parts
Average particle size (average long axis length): 0.15
Average acicular ratio: 7
BET specific surface area: 52 m$^2$/g
Carbon black: 20.0 parts
Average particle size: 20 nm
A vinyl chloride copolymer: 13.0 parts
SO$_3$Na group-containing polyurethane resin: 6.0 parts
Phenylphosphonic acid: 3.0 parts
Methyl ethyl ketone: 155.0 parts
Stearic acid: 3.0 parts
Butyl stearate: 3.0 parts
Polyisocyanate: 5.0 parts
Cyclohexanone: 355.0 parts
(5) Preparation of Each Layer Forming Composition The magnetic layer forming composition was prepared by the following method. The magnetic solution was prepared by dispersing (beads-dispersing) each component by using a batch type vertical sand mill for 24 hours. Zirconia beads having a bead diameter of 0.1 mm were used as the dispersion beads. The prepared magnetic solution and the abrasive liquid were mixed with other components (silica sol, other components, and finishing additive solvent) and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 µm, and the magnetic layer farming composition was prepared.

The non-magnetic layer forming composition was prepared by the following method. Each component excluding stearic acid, stearic acid amide, butyl stearate, cyclohexanone, and methyl ethyl ketone was dispersed by using batch type vertical sand mill for 24 hours to obtain a dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having a hole diameter of 0.5 µm and a non-magnetic layer forming composition was prepared.

The back coating layer forming composition was prepared by the following method. Each component excluding the lubricant stearic acid, butyl stearate, polyisocyanate, and cyclohexanone was kneaded and diluted by an open kneader. Then, the obtained mixed solution was subjected to a dispersion process of 12 passes, with a transverse beads mill dispersing device by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1 µm and a back coating layer forming composition was prepared.

(6) Manufacturing Method of Magnetic Tape

A magnetic tape was manufactured by the specific aspect shown in FIG. 1. The magnetic tape was specifically manufactured as follows.

A support made of polyethylene naphthalate having a thickness of 5.00 µm was sent from the sending part, and the non-magnetic layer forming composition prepared in the section (5) was applied to one surface thereof so that the thickness after the drying becomes 1.00 µm in the first coating part, to form a coating layer. The cooling step was performed by passing the formed coating layer through the cooling zone in which the atmosphere temperature is adjusted to 0° C. for the staying time shown in Table 6 while the coating layer is wet, and then the heating and drying step was performed by passing the coating layer through the first heating process zone at the atmosphere temperature of 100° C., to form a non-magnetic layer.

Then, the magnetic layer forming composition prepared in the section (5) was applied onto the non-magnetic layer so that the thickness after the drying becomes 60 nm (0.06 µm) in the second coating part, and a coating layer was formed. The smoothing process was performed with respect to the coating layer, while the coating layer is wet (not dried). The smoothing process was performed by applying shear to the coating layer using a commercially available solid smoother (center line average surface roughness (catalogue value): 1.2 nm). After that, a homeotropic alignment process was performed in the orientation zone by applying a magnetic field having a magnetic field strength of 0.3 T in a vertical direction with respect to the surface of the coating layer, and the coating layer was dried in the second heating process zone (atmosphere temperature of 100° C.).

After that, in the third coating part, the back coating layer forming composition prepared in the section (5) was applied to the surface of the non-magnetic support made of polyethylene naphthalate on a side opposite to the surface where the non-magnetic layer and the magnetic layer are formed, so that the thickness after the drying becomes 0.40 µm, to form a coating layer, and the formed coating layer was dried in a third heating process zone (atmosphere temperature of 100° C.).

After that, a calender process (surface smoothing treatment) was performed with a calender roll configured of only a metal roll, at a speed of 80 m/min, linear pressure of 294 kN/m (300 kg/cm), and a calender temperature (surface temperature of a calender roll) shown in Table 6.

Then, a heating process was performed in the environment of the atmosphere temperature of 70° C. for 36 hours. After the heating process, the layer was slit to have a width of ½ inches (0.0127 meters), and then, a servo pattern was formed on the magnetic layer by the same method as that in Example 1-1. By doing so, a magnetic tape was obtained.

In a case where the thickness of each layer and the thickness of the non-magnetic support of the magnetic tape manufactured as described above were acquired by the same method as that in Example 1-1, it was confirmed that the thickness of each layer and the thickness of the non-magnetic support were the thicknesses described above.

A part of the magnetic tape manufactured by the method described above was used in the evaluation of physical properties described below, and the other part was used in order to measure an SNR and a resistance value of the TMR head which will be described later.

2. Evaluation of Physical Properties of Ferromagnetic Powder (1) Average Particle Size of Ferromagnetic Powder An average particle size of the ferromagnetic powder was obtained by the method described above.

(2) Saturation Magnetization σs of Ferromagnetic Powder

The saturation magnetization σs of the ferromagnetic powder was measured with an applied magnetic field of 796 kA/m (10 kOe) by using an oscillation sample type magnetic-flux meter (manufactured by Toei Industry Co., Ltd.).

The evaluation was performed in Examples and Comparative Examples which will be described later in the same manner as described above.

3. Evaluation of Physical Properties of Magnetic Tape (1) Center Line Average Surface Roughness Ra Measured Regarding Surface of Magnetic Layer The center line average surface roughness Ra was acquired regarding the surface of the magnetic layer by the same method as that in Example 1-1.

(2) C-H Derived C Concentration

The C-H derived C concentration was acquired by the same method as that in Example 1-1.

(3) Magnetic Cluster Area Ratio Sdc/Sac

The Sdc and Sac were obtained by the method described above and the magnetic cluster area ratio Sdc/Sac was calculated from the obtained values. As a magnetic force microscope, Dimension 3100 manufactured by Bruker in a frequency modulation mode was used, and as a probe, SSS-MFMR (nominal radius of curvature of 15 nm) manufactured by NanoWorld AG was used. A distance between the surface of the magnetic layer and a distal end of the probe at the time of the magnetic force microscope observation is 20 nm. As image analysis software, MATLAB manufactured by Math Works was used.

4. Measurement of SNR in Case of Reproducing Information Recorded on Magnetic Tape with Reproducing Head In an environment of an atmosphere temperature of 23° C.±1° C. and relative humidity of 50%, the magnetic tape manufactured in the part 1. was attached to a reel tester having a width of ½ inches (0.0127 meters) fixed to a recording head and a reproducing head, and information was recorded and reproduced. As the recording head, a metal-in-gap (MIG) head (gap length of 0.15 μm, track width of 1.0 μm) was used, and the reproducing head, a TMR head (element width of 70 nm) commercially available as a reproducing head for HDD was used. The recording was performed at linear recording density of 300 kfci, the reproduction output at the time of reproducing was measured, and the SNR was obtained as a ratio of the reproduction output and noise. The magnetic tape transportation speed (relative speed of the magnetic tape and the magnetic head) in a case of performing the reproduction was set as a value shown in Table 6. The SNR was calculated as a relative value by setting the SNR measured as 0 dB in Comparative Example 2-1 which will be described later. In a case where the SNR calculated as described above is equal to or greater than 7.0 dB, it is possible to evaluate that performance of dealing with future needs accompanied with high-density recording is obtained.

5. Measurement of Resistance Value of Reproducing Head

In an environment of an atmosphere temperature of 23° C.±1° C. and relative humidity of 50%, the magnetic tape manufactured in the part 1. was attached to a reel tester having a width of ½ inches (0.0127 meters) fixed to a recording head and a reproducing head, and information was recorded and reproduced. As the recording head, a MIG head (gap length of 0.15 μm, track width of 1.0 μm) was used, and the TMR head (element width of 70 nm) commercially available as a reproducing head for HDD was used as the reproducing head. A tape length of the magnetic tape was 1,000 m, and a total of 4,000 passes of the transportation (running) of the magnetic tape was performed by setting the relative speed of the magnetic tape and the magnetic head (magnetic tape transportation speed) at the time of performing reproducing as a value shown in Table 6. The reproducing head was moved in a width direction of the magnetic tape by 2.5 μm for 1 pass, a resistance value (electric resistance) of the reproducing head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a reproducing head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 6.

6. Measurement of SNR in Case of Reading Servo Pattern of Magnetic Tape with Servo Head The servo head of the servo tester was replaced with a commercially available TMR head (element width of 70 nm) as a reproducing head for HDD. The reading of a servo pattern was performed by attaching the magnetic tape manufactured in the section 1. to the servo tester and by setting the magnetic tape transportation speed (relative speed of the magnetic tape and the servo head) as a value shown in Table 6, and the SNR was obtained as a ratio of the output and noise. The SNR was calculated as a relative value by setting the SNR measured as 0 dB in Comparative Example 2-1 which will be described later. In a case where the SNR calculated as described above is equal to or greater than 7.0 dB, it is possible to evaluate that performance of dealing with future needs accompanied with high-density recording is obtained.

7. Measurement of Resistance Value of Servo Head

The servo head of the servo tester was replaced with a commercially available TMR head (element width of 70 nm) as a reproducing head for HDD. In the servo tester, the magnetic tape manufactured in the part 1. was transported while bringing the surface of the magnetic layer into contact with the servo head and causing sliding therebetween. A tape length of the magnetic tape was 1,000 m, and a total of 4,000 passes of the transportation (running) of the magnetic tape was performed by setting the magnetic tape transportation speed (relative speed of the magnetic tape and the servo head) at the time of the transportation as a value shown in Table 6. The servo head was moved in a width direction of the magnetic tape by 2.5 μm for 1 pass, a resistance value (electric resistance) of the servo head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a servo head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 6.

Examples 2-2 to 2-11 and Comparative Examples 2-1 to 2-12

1. Manufacturing of Magnetic Tape

A magnetic tape was manufactured in the same manner as in Example 2-1, except that various conditions shown in Table 6 were changed as shown in Table 6.

As the polyurethane resin A shown in Table 6, a polyurethane resin A used in examples of JP4001532B is used.

As the polyurethane resin B shown in Table 6, a polyurethane resin B used in comparative examples of JP4001532B is used.

As the vinyl chloride resin shown in Table 6, MR-110 manufactured by Zeon Corporation is used.

The polyurethane resin A is a binding agent having higher affinity with the solvent used in the preparation of the magnetic layer forming composition, compared to the polyurethane resin B and the vinyl chloride resin.

In Table 6, in the examples and the comparative examples in which "performed" is disclosed in a column of the smoothing process, the smoothing process was used in the same manner as in Example 2-1. In the comparative examples in which "not performed" is disclosed in a column of the smoothing process, the magnetic tape was manufactured by a manufacturing step in which the smoothing process is not performed.

In Table 6, in the comparative examples in which "not performed" is disclosed in a column of the cooling zone staying time, a magnetic tape was manufactured by a manufacturing step not including a cooling zone.

2. Evaluation of Physical Properties of Magnetic Tape

Various physical properties of the manufactured magnetic tape was evaluated in the same manner as in Example 2-1.

3. Measurement of SNR in Case of Reproducing Information Recorded on Magnetic Tape with Reproducing Head The SNR was measured by the same method as that in Example 2-1, by using the manufactured magnetic tape. The magnetic tape transportation speed in a case of performing the reproduction was set as a value shown in Table 6. In Examples 2-2 to 2-11 and Comparative Examples 2-5 to 2-12, the TMR head which was the same as that in Example 2-1 was used as a reproducing head. In Comparative Examples 2-1 to 2-4, a commercially available spin valve type GMR head (element width of 70 nm) was used as a reproducing head.

4. Measurement of Resistance Value of Reproducing Head

A resistance value of the reproducing head was measured by the same method as that in Example 2-1, by using the manufactured magnetic tape. The magnetic tape transportation speed in a case of performing the reproduction was set as a value shown in Table 6. As the reproducing head, the same reproducing head (TMR head or GMR head) as the reproducing head used in the measurement of the SNR was used. In Comparative Examples 2-1 to 2-4, the GMR head used as the reproducing head was a magnetic head having a CIP structure including two electrodes with an MR element interposed therebetween in a direction orthogonal to the transportation direction of the magnetic tape. A resistance value was measured in the same manner as in Example 2-1, by bringing an electric resistance measuring device into contact with a wiring connecting these two electrodes.

5. Measurement of SNR in Case of Reading Servo Pattern of Magnetic Tape with Servo Head The SNR was measured by the same method as that in Example 2-1, by using the manufactured magnetic tape. The magnetic tape transportation speed in a case of reading a servo pattern was set as a value shown in Table 6. In Examples 2-2 to 2-11 and Comparative Examples 2-5 to 2-12, the TMR head which was the same as that in Example 2-1 was used as a servo head. In Comparative Examples 2-1 to 2-4, a commercially available spin valve type GMR head (element width of 70 nm) was used as a servo head.

6. Measurement of Resistance Value of Servo Head

A resistance value of the servo head was measured by the same method as that in Example 2-1, by using the manufactured magnetic tape. The magnetic tape transportation speed in a case of reading a servo pattern was set as a value shown in Table 6. As the servo head, the same servo head (TMR head or GMR head) as the servo head used in the measurement of the SNR was used. In Comparative Examples 2-1 to 2-4, the GMR head used as the servo head was a magnetic head having a CIP structure including two electrodes with an MR element interposed therebetween in a direction orthogonal to the transportation direction of the magnetic tape. A resistance value was measured in the same manner as in Example 2-1, by bringing an electric resistance measuring device into contact with a wiring connecting these two electrodes.

The results of the evaluations described above are shown in Table 6.

TABLE 6-1

| | Ferromagnetic hexagonal ferrite powder | | Magnetic layer forming composition | | | | Colloidal silica | | |
|---|---|---|---|---|---|---|---|---|---|
| | Average particle size (nm) | σs (A·m²/kg) | Polyurethane resin A | Polyurethane resin B | Vinyl chloride resin | Smoothing process | average particle size | Calender temperature | Cooling zone staying time |
| Comparative Example 2-1 | 25 | 50 | | 8.0 | 2.0 | Not performed | 120 nm | 80° C. | Not performed |
| Comparative Example 2-2 | 25 | 50 | | 8.0 | 2.0 | Not performed | 120 nm | 90° C. | Not performed |
| Comparative Example 2-3 | 25 | 50 | | 8.0 | 2.0 | Not performed | 80 nm | 90° C. | Not performed |
| Comparative Example 2-4 | 25 | 50 | | 8.0 | 2.0 | Not performed | 40 nm | 110° C. | Not performed |
| Comparative Example 2-5 | 25 | 50 | | 8.0 | 2.0 | Not performed | 120 nm | 80° C. | Net performed |
| Comparative Example 2-6 | 25 | 50 | | 8.0 | 2.0 | Not performed | 120 nm | 90° C. | Not performed |
| Comparative Example 2-7 | 25 | 50 | | 8.0 | 2.0 | Not performed | 80 nm | 90° C. | Not performed |
| Comparative Example 2-8 | 25 | 50 | | 8.0 | 2.0 | Not performed | 40 nm | 110° C. | Not performed |
| Comparative Example 2-9 | 25 | 50 | 10.0 | | | Performed | 80 nm | 90° C. | Not performed |

TABLE 6-1-continued

| | Ferromagnetic hexagonal ferrite powder | | Magnetic layer forming composition | | | | Colloidal silica | | |
|---|---|---|---|---|---|---|---|---|---|
| | Average particle size (nm) | σs (A·m²/kg) | Poly-urethane resin A | Poly-urethane resin B | Vinyl chloride resin | Smoothing process | average particle size | Calender temperature | Cooling zone staying time |
| Comparative Example 2-10 | 25 | 50 | 10.0 | | | Performed | 80 nm | 90° C. | 180 seconds |
| Compatative Example 2-11 | 25 | 50 | | 8.0 | 2.0 | Not performed | 80 nm | 90° C. | 1 second |
| Comparative Example 2-12 | 25 | 50 | | 8.0 | 2.0 | Not performed | 80 nm | 90° C. | Not performed |
| Example 2-1 | 25 | 50 | 10.0 | | | Performed | 80 nm | 90° C. | 1 second |
| Example 2-2 | 25 | 50 | 11.0 | | | Performed | 80 nm | 90° C. | 1 second |
| Example 2-3 | 25 | 50 | 12.0 | | | Performed | 80 nm | 90° C. | 1 second |
| Example 2-4 | 25 | 50 | 15.0 | | | Performed | 80 nm | 90° C. | 1 second |
| Example 2-5 | 27 | 50 | 10.0 | | | Performed | 80 nm | 90° C. | 1 second |
| Example 2-6 | 20 | 43 | 13.0 | | | Performed | 80 nm | 90° C. | 1 second |
| Example 2-7 | 25 | 50 | 12.0 | | | Performed | 80 nm | 90° C. | 1 second |
| Example 2-8 | 25 | 50 | 12.0 | | | Performed | 80 nm | 90° C. | 50 seconds |
| Example 2-9 | 25 | 50 | 12.0 | | | Performed | 40 nm | 110° C. | 50 seconds |
| Example 2-10 | 25 | 50 | 12.0 | | | Performed | 40 nm | 110° C. | 50 seconds |
| Example 2-11 | 25 | 50 | 12.0 | | | Performed | 40 nm | 110° C. | 50 seconds |

TABLE 6-2

Evaluation Results of Physical Properties of Magnetic Tape

| | Center line average surface roughness Ra measured regarding surface of magnetic layer | C-H derived C concentration | Magnetic cluster | | |
|---|---|---|---|---|---|
| | | | Sdc (nm²) | Sac (nm²) | Sdc/Sac |
| Comparative Example 2-1 | 2.8 nm | 35 atom% | 23000 | 15000 | 1.53 |
| Comparative Example 2-2 | 2.5 nm | 35 atom% | 23000 | 15000 | 1.53 |
| Comparative Example 2-3 | 2.0 nm | 35 atom% | 23000 | 15000 | 1.53 |
| Comparative Example 2-4 | 1.5 nm | 35 atom% | 23000 | 15000 | 1.53 |
| Comparative Example 2-5 | 2.8 nm | 35 atom% | 23000 | 15000 | 1.53 |
| Comparative Example 2-6 | 2.5 nm | 35 atom% | 23000 | 15000 | 1.53 |
| Comparative Example 2-7 | 2.0 nm | 35 atom% | 23000 | 15000 | 1.53 |
| Comparative Example 2-8 | 1.5 nm | 35 atom% | 23000 | 15000 | 1.53 |
| Comparative Example 2-9 | 2.0 nm | 35 atom% | 19000 | 15000 | 1.27 |
| Comparative Example 2-10 | 2.0 nm | 70 atom% | 19000 | 15000 | 1.27 |
| Comparative Example 2-11 | 2.0 nm | 45 atom% | 23000 | 15000 | 1.53 |
| Comparative Example 2-12 | 2.0 nm | 35 atom% | 23000 | 15000 | 1.53 |
| Example 2-1 | 2.0 nm | 45 atom% | 19000 | 15000 | 1.27 |
| Example 2-2 | 2.0 nm | 45 atom% | 16000 | 15000 | 1.07 |
| Example 2-3 | 2.0 nm | 45 atom% | 14000 | 15000 | 0.93 |
| Example 2-4 | 2.0 nm | 45 atom% | 12000 | 15000 | 0.80 |
| Example 2-5 | 2.0 nm | 45 atom% | 24000 | 21000 | 1.14 |
| Example 2-6 | 2.0 nm | 45 atom% | 11000 | 12000 | 0.92 |
| Example 2-7 | 2.0 nm | 55 atom% | 14000 | 15000 | 0.93 |
| Example 2-8 | 2.0 nm | 65 atom% | 14000 | 15000 | 0.93 |
| Example 2-9 | 1.5 nm | 65 atom% | 14000 | 15000 | 0.93 |
| Example 2-10 | 1.5 nm | 65 atom% | 14000 | 15000 | 0.93 |
| Example 2-11 | 1.5 nm | 65 atom% | 14000 | 15000 | 0.93 |

TABLE 6-3

Evaluation Results Regarding Reproducing Head

| | Reproducing head | Transportation speed | SNR (dB) | Number of times of occurrence of decrease in resistance value (times) | Rate of decrease in resistance value (%) |
|---|---|---|---|---|---|
| Comparative Example 2-1 | GMR | 18 m/sec | 0 | 0 | 0 |
| Comparative Example 2-2 | GMR | 18 m/sec | 2.2 | 0 | 0 |
| Comparative Example 2-3 | GMR | 18 m/sec | 4.5 | 0 | 0 |
| Comparative Example 2-4 | GMR | 18 m/sec | 6.8 | 0 | 0 |
| Comparative Example 2-5 | TMR | 18 m/sec | 0.7 | 1 | — |
| Comparative Example 2-6 | TMR | 18 m/sec | 3.2 | 3 | — |
| Comparative Example 2-7 | TMR | 18 m/sec | 5.5 | 7 | — |
| Comparative Example 2-8 | TMR | 18 m/sec | 7.7 | 9 | — |
| Comparative Example 2-9 | TMR | 18 m/sec | 7.0 | 7 | — |
| Comparative Example 2-10 | TMR | 18 m/sec | 7.0 | 1 | — |
| Comparative Example 2-11 | TMR | 18 m/sec | 5.5 | 0 | 5 |
| Comparative Example 2-12 | TMR | 19 m/sec | 5.5 | 0 | 20 |
| Example 2-1 | TMR | 18 m/sec | 7.0 | 0 | 5 |
| Example 2-2 | TMR | 18 m/sec | 7.2 | 0 | 5 |
| Example 2-3 | TMR | 18 m/sec | 7.5 | 0 | 6 |
| Example 2-4 | TMR | 18 m/sec | 7.3 | 0 | 7 |
| Example 2-5 | TMR | 18 m/sec | 7.2 | 0 | 5 |
| Example 2-6 | TMR | 18 m/sec | 7.5 | 0 | 4 |
| Example 2-7 | TMR | 18 m/sec | 7.5 | 0 | 2 |
| Example 2-8 | TMR | 18 m/sec | 7.5 | 0 | 1 |
| Example 2-9 | TMR | 18 m/sec | 9.3 | 0 | 11 |
| Example 2-10 | TMR | 10 m/sec | 9.3 | 0 | 14 |
| Example 2-11 | TMR | 1 m/sec | 9.3 | 0 | 19 |

TABLE 6-4

Evaluation Results Regarding Servo Head

| | Servo head | Transportation speed | SNR (dB) | Number of times of occurrence of decrease in resistance value (times) | Rate of decrease in resistance value (%) |
|---|---|---|---|---|---|
| Comparative Example 2-1 | GMR | 18 m/sec | 0 | 0 | 0 |
| Comparative Example 2-2 | GMR | 18 m/sec | 2.2 | 0 | 0 |

TABLE 6-4-continued

Evaluation Results Regarding Servo Head

| | Servo head | Transportation speed | SNR (dB) | Number of times of occurrence of decrease in resistance value (times) | Rate of decrease in resistance value (%) |
|---|---|---|---|---|---|
| Comparative Example 2-3 | GMR | 18 m/sec | 4.5 | 0 | 0 |
| Comparative Example 2-4 | GMR | 18 m/sec | 6.8 | 0 | 0 |
| Comparative Example 2-5 | TMR | 18 m/sec | 0.7 | 1 | — |
| Comparative Example 2-6 | TMR | 18 m/sec | 3.2 | 3 | — |
| Comparative Example 2-7 | TMR | 18 m/sec | 5.5 | 7 | — |
| Comparative Example 2-8 | TMR | 18 m/sec | 7.7 | 9 | — |
| Comparative Example 2-9 | TMR | 18 m/sec | 7.0 | 7 | — |
| Comparative Example 2-10 | TMR | 18 m/sec | 7.0 | 1 | — |
| Comparative Example 2-11 | TMR | 18 m/sec | 5.5 | 0 | 5 |
| Comparative Example 2-12 | TMR | 19 m/sec | 5.5 | 0 | 20 |
| Example 2-1 | TMR | 18 m/sec | 7.0 | 0 | 5 |
| Example 2-2 | TMR | 18 m/sec | 7.2 | 0 | 5 |
| Example 2-3 | TMR | 18 m/sec | 7.5 | 0 | 6 |
| Example 2-4 | TMR | 18 m/sec | 7.3 | 0 | 7 |
| Example 2-5 | TMR | 18 m/sec | 7.2 | 0 | 5 |
| Example 2-6 | TMR | 18 m/sec | 7.5 | 0 | 4 |
| Example 2-7 | TMR | 18 m/sec | 7.5 | 0 | 2 |
| Example 2-8 | TMR | 18 m/sec | 7.5 | 0 | 1 |
| Example 2-9 | TMR | 18 m/sec | 9.3 | 0 | 11 |
| Example 2-10 | TMR | 10 m/sec | 9.3 | 0 | 14 |
| Example 2-11 | TMR | 1 m/sec | 9.3 | 0 | 19 |

As shown in Table 6, in Examples 2-1 to 2-11, the information recorded on the magnetic tape at high linear recording density could be reproduced at a high SNR by using the TMR head as the reproducing head. In addition, in Examples 2-1 to 2-11, the servo pattern could be read at a high SNR by using the TMR head as the servo head. Further, in Examples 2-1 to 2-11, a significant decrease in resistance value of the TMR head can be prevented, in a case of reproducing information recorded on the magnetic tape having the magnetic layer surface roughness Ra equal to or smaller than 2.0 nm and in a case of reading a servo pattern, by setting the magnetic tape transportation speed to be equal to or lower than 18 m/sec.

The invention is effective for usage of magnetic recording for which high-sensitivity reproducing of information recorded with high density is desired.

What is claimed is:

1. A magnetic tape device comprising:
a magnetic tape; and
a reproducing head,
wherein a magnetic tape transportation speed of the magnetic tape device is equal to or lower than 18 m/sec,
the reproducing head is a magnetic head including a tunnel magnetoresistance effect type element as a reproducing element,
the magnetic tape includes a non-magnetic support, and a magnetic layer including ferromagnetic powder and a binding agent on the non-magnetic support,
a center line average surface roughness Ra measured regarding a surface of the magnetic layer is equal to or smaller than 2.0 nm,
the magnetic layer includes one or more components selected from the group consisting of fatty acid and fatty acid amide,
a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and
ΔSFD in a longitudinal direction of the magnetic tape calculated by Expression 1 is equal to or smaller than 0.50, $$\Delta \text{SFD} = \text{SFD}_{25°\ C.} - \text{SFD}_{-190°\ C.} \quad \text{Expression 1}$$

in Expression 1, the $\text{SFD}_{25°\ C.}$ is a switching field distribution SFD measured in a longitudinal direction of the magnetic tape at a temperature of 25° C., and the $\text{SFD}_{-190°\ C.}$ is a switching field distribution SFD measured in a longitudinal direction of the magnetic tape at a temperature of −190° C.

2. A magnetic tape device comprising:
a magnetic tape; and
a servo head,
wherein a magnetic tape transportation speed of the magnetic tape device is equal to or lower than 18 m/sec,
the servo head is a magnetic head including a tunnel magnetoresistance effect type element as a servo pattern reading element,
the magnetic tape includes a non-magnetic support, and a magnetic layer including ferromagnetic powder and a binding agent on the non-magnetic support,
the magnetic layer includes a servo pattern,
a center line average surface roughness Ra measured regarding a surface of the magnetic layer is equal to or smaller than 2.0 nm,
the magnetic layer includes one or more components selected from the group consisting of fatty acid and fatty acid amide,
a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and
ΔSFD in a longitudinal direction of the magnetic tape calculated by Expression 1 is equal to or smaller than 0.50, $$\Delta \text{SFD} = \text{SFD}_{25°\ C.} - \text{SFD}_{-190°\ C.} \quad \text{Expression 1}$$

in Expression 1, the $\text{SFD}_{25°\ C.}$ is a switching field distribution SFD measured in a longitudinal direction of the magnetic tape at a temperature of 25° C., and the $\text{SFD}_{-190°\ C.}$ is a switching field distribution SFD measured in a longitudinal direction of the magnetic tape at a temperature of −190° C.

3. The magnetic tape device according to claim 1, wherein the ΔSFD is 0.03 to 0.50.

4. A magnetic tape device comprising:
a magnetic tape; and
a reproducing head,
wherein a magnetic tape transportation speed of the magnetic tape device is equal to or lower than 18 m/sec,
the reproducing head is a magnetic head including a tunnel magnetoresistance effect type element as a reproducing element,
the magnetic tape includes a non-magnetic support, and a magnetic layer including ferromagnetic powder and a binding agent on the non-magnetic support,
a center line average surface roughness Ra measured regarding a surface of the magnetic layer is equal to or smaller than 2.0 nm,
the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

5. A magnetic tape device comprising:
a magnetic tape; and
a servo head,
wherein a magnetic tape transportation speed of the magnetic tape device is equal to or lower than 18 m/sec,
the servo head is a magnetic head including a tunnel magnetoresistance effect type element as a servo pattern reading element,
the magnetic tape includes a non-magnetic support, and a magnetic layer including ferromagnetic powder and a binding agent on the non-magnetic support,
the magnetic layer includes a servo pattern,
a center line average surface roughness Ra measured regarding a surface of the magnetic layer is equal to or smaller than 2.0 nm,
the magnetic layer includes one or more components selected from the group consisting of fatty acid and fatty acid amide,
a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and
a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

6. The magnetic tape device according to claim 1, wherein the center line average surface roughness Ra measured regarding the surface of the magnetic layer is 1.2 nm to 2.0 nm.

7. The magnetic tape device according to claim 1, wherein the magnetic tape includes a non-magnetic layer including non-magnetic powder and a binding agent between the non-magnetic support and the magnetic layer.

8. A magnetic reproducing method comprising:
reproducing information recorded on a magnetic tape by a reproducing head,
wherein a magnetic tape transportation speed during the reproducing is equal to or lower than 18 m/sec,
the reproducing head is a magnetic head including a tunnel magnetoresistance effect type element as a reproducing element,
the magnetic tape includes a non-magnetic support, and a magnetic layer including ferromagnetic powder and a binding agent on the non-magnetic support,
a center line average surface roughness Ra measured regarding a surface of the magnetic layer is equal to or smaller than 2.0 nm,
the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and ΔSFD in a longitudinal direction of the magnetic tape calculated by Expression 1 is equal to or smaller than 0.50, $$\Delta SFD = SFD_{25°\ C.} - SFD_{-190°\ C.} \quad \text{Expression 1}$$

in Expression 1, the $SFD_{25°\ C.}$ is a switching field distribution SFD measured in a longitudinal direction of the magnetic tape at a temperature of 25° C., and the $SFD_{-190°\ C.}$ is a switching field distribution SFD measured in a longitudinal direction of the magnetic tape at a temperature of −190° C.

9. The magnetic reproducing method according to claim 8,
wherein the ΔSFD is 0.03 to 0.50.

10. A magnetic reproducing method comprising:
reproducing information recorded on a magnetic tape by a reproducing head,
wherein a magnetic tape transportation speed during the reproducing is equal to or lower than 18 m/sec,
the reproducing head is a magnetic head including a tunnel magnetoresistance effect type element as a reproducing element,
the magnetic tape includes a non-magnetic support, and a magnetic layer including ferromagnetic powder and a binding agent on the non-magnetic support,
a center line average surface roughness Ra measured regarding a surface of the magnetic layer is equal to or smaller than 2.0 nm,
the magnetic layer includes one or more components selected from the group consisting of fatty acid and fatty acid amide,
a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and
a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

11. The magnetic reproducing method according to claim 8,
wherein the center line average surface roughness Ra measured regarding the surface of the magnetic layer is 1.2 nm to 2.0 nm.

12. The magnetic reproducing method according to claim 8,
wherein the magnetic tape includes a non-magnetic layer including non-magnetic powder and a binding agent between the non-magnetic support and the magnetic layer.

13. A head tracking servo method comprising:
reading a servo pattern of a magnetic layer of a magnetic tape by a servo head in a magnetic tape device,
wherein a magnetic tape transportation speed of the magnetic tape device is equal to or lower than 18 m/sec,
the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and ΔSFD in a longitudinal direction of the magnetic tape calculated by Expression 1 is equal to or smaller than 0.50, $$\Delta SFD = SFD_{25° C.} - SFD_{-190° C.} \qquad \text{Expression 1}$$

in Expression 1, the $SFD_{25° C.}$ is a switching field distribution SFD measured in a longitudinal direction of the magnetic tape at a temperature of 25° C., and the $SFD_{-190° C.}$ is a switching field distribution SFD measured in a longitudinal direction of the magnetic tape at a temperature of −190° C.

14. The head tracking servo method according to claim 13,
wherein the ΔSFD is 0.03 to 0.50.

15. A head tracking servo method comprising:
reading a servo pattern of a magnetic layer of a magnetic tape by a servo head in a magnetic tape device,
wherein a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer is equal to or smaller than 2.0 nm, the magnetic layer includes one or more components selected from the group consisting of fatty acid and fatty acid amide, a C-H derived C concentration calculated from a C-H peak area ratio of C1s spectra obtained by X-ray photoelectron spectroscopic analysis performed on the surface of the magnetic layer at a photoelectron take-off angle of 10 degrees is 45 to 65 atom %, and a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

16. The head tracking servo method according to claim 13,
wherein the center line average surface roughness Ra measured regarding the surface of the magnetic layer is 1.2 nm to 2.0 nm.

17. The head tracking servo method according to claim 13,
wherein the magnetic tape includes a non-magnetic layer including non-magnetic powder and a binding agent between the non-magnetic support and the magnetic layer.

* * * * *